US012711161B1

(12) United States Patent
Wilson et al.

(10) Patent No.: US 12,711,161 B1
(45) Date of Patent: Aug. 18, 2026

(54) SYSTEMS AND METHODS PREDICTING RELATIONSHIPS FROM DISPARATE DATA OBJECTS

(71) Applicant: LitPro LLC, Waxhaw, NC (US)

(72) Inventors: William Corey Wilson, Wilmington, NC (US); Andrea Layne Morton, Fort Mill, SC (US); Shaghayegh Ramezanian, Waxhaw, NC (US); Michelle Macko Prince, Charlotte, NC (US)

(73) Assignee: LitPro LLC, Waxhaw, NC (US)

( * ) Notice: Subject to any disclaimer, the term of this patent is extended or adjusted under 35 U.S.C. 154(b) by 21 days.

(21) Appl. No.: 19/215,711

(22) Filed: May 22, 2025

(51) Int. Cl.
*G06F 16/28* (2019.01)
*G06F 16/21* (2019.01)
*G06F 16/25* (2019.01)

(52) U.S. Cl.
CPC .......... *G06F 16/288* (2019.01); *G06F 16/219* (2019.01); *G06F 16/254* (2019.01)

(58) Field of Classification Search
None
See application file for complete search history.

(56) References Cited

U.S. PATENT DOCUMENTS 10,896,222 B1 * 1/2021 Christodoulopoulos .................... G06F 40/30
12,204,862 B2 * 1/2025 Zhang .................... G06N 20/00
2014/0351267 A1 * 11/2014 Kumar ................ G06F 18/2323 707/748
2015/0170066 A1 * 6/2015 Pawar .................. G06Q 10/063 705/7.11
2018/0082183 A1 * 3/2018 Hertz ..................... G06Q 10/10
2018/0277246 A1 * 9/2018 Zhong .................. A61B 5/4839
2019/0236084 A1 * 8/2019 Lavine .................. G06F 16/248
2019/0278777 A1 * 9/2019 Malik ................. G06F 16/9024
2019/0286504 A1 * 9/2019 Muntés-Mulero .......................... G06F 11/0709
2020/0409936 A1 * 12/2020 Salkola ................... H04L 51/02
2021/0026859 A1 * 1/2021 Vangala ............ G06F 16/24578
2021/0390395 A1 * 12/2021 Ait-Mokhtar ......... G06F 40/284
2023/0060252 A1 * 3/2023 Bly .......................... G06N 7/01
2023/0129430 A1 * 4/2023 Reiter ................ G06Q 10/1053 705/321
2023/0409563 A1 * 12/2023 Franklin ............... G06F 16/256
2025/0045256 A1 * 2/2025 Gottlob ................. G06F 16/211

* cited by examiner

*Primary Examiner* — Khanh B Pham
*Assistant Examiner* — Navneet Gmahl
(74) *Attorney, Agent, or Firm* — Dickinson Wright PLLC

(57) ABSTRACT

Systems and methods are provided for automatically identifying and extracting relationships between disparate data structures received from different sources. Examples include obtaining a historical data structure comprising first data objects associated with second data objects; and building a weighted mapping based on mapping the first data objects to the second data objects by linking each of the first data objects to each of the second data and encoding the links with weights determined by, for each mapped pair, determining a weight for the link associated with the mapped pair based on tracking metadata associated with instance of the historical data object pairs corresponding to the mapped pair. Examples also include determining probabilistic relationships between second input data objects and a first input data object based on the weighted mapping and updating an input data structure comprising the second input data objects.

20 Claims, 10 Drawing Sheets

400

402 404 406A 406B

| Injury | Coded ID | Label A | Label B |
|---|---|---|---|
| Mesothelioma | Code A | Related/Approved | Agreed |
| Mesothelioma | Code B | Unrelated/Rejected | Agreed |
| Mesothelioma | Code C | Related/Approved | Disagreed |
| Mesothelioma | Code D | Unrelated/Rejected | Disagreed |
| Mesothelioma | Code A | Unrelated/Rejected | Disagreed |
| Mesothelioma | Code B | Related/Approved | Agreed |
| Mesothelioma | Code A | Related/Approved | Disagreed |
| Mesothelioma | Code A | Related/Approved | Agreed |
| Brain Tumor | Code A | Unrelated/Rejected | Agreed |
| Brain Tumor | Code B | Related/Approved | Agreed |
| Brain Tumor | Code C | Related/Approved | Disagreed |
| Brain Tumor | Code D | Unrelated/Rejected | Disagreed |
| Blood cancer - Advanced Systemic Mastocytosis with Associated Hematologic Neoplasm; Mast Cell Malignancy | Code A | Unrelated/Rejected | Agreed |
| Blood cancer - Advanced Systemic Mastocytosis with Associated Hematologic Neoplasm; Mast Cell Malignancy | Code B | Related/Approved | Agreed |
| Blood cancer - Advanced Systemic Mastocytosis with Associated Hematologic Neoplasm; Mast Cell Malignancy | Code C | Related/Approved | Disagreed |
| Blood cancer - Advanced Systemic Mastocytosis with Associated Hematologic Neoplasm; Mast Cell Malignancy | Code D | Related/Approved | Disagreed |

| Claimant ID | Injury | Date of Injury | SSN | Name |
| --- | --- | --- | --- | --- |
| 1234123123 | Mesothelioma | 12/2/2021 | 111-11-1111 | John Doe |
| 9283834 | Brain Tumor | 11/4/2021 | 222-22-2222 | Jane Doe |
| 72639340 | Blood cancer - Advanced Systemic Mastocytosis with Associated Hematologic Neoplasm; Mast Cell Malignancy | 4/8/1999 | 333-33-3333 | Mike Doe |

700

| Patient ID (702) | Treatment Date (704) | ICD (706) | Description (708) | Amount (710) |
|---|---|---|---|---|
| 12344123123 | 10/24/2011 | 518.89 | Other diseases of lung, not elsewhere classified | 44.78 |
| 12344123123 | 10/24/2011 | 780.57 | Unspecified sleep apnea | 59.11 |
| 12344123123 | 10/24/2011 | V04.81 | Need for prophylactic vaccination and inoculation against influenza | 52.46 |
| 12344123123 | 2/13/2022 | C80.1 | Malignant (primary) neoplasm, unspecified | 10.05 |
| 12344123123 | 2/13/2022 | J91.0 | Malignant pleural effusion | 221.73 |
| 12344123123 | 2/13/2022 | R91.8 | Other nonspecific abnormal finding of lung field | 9.25 |
| 12344123123 | 3/5/2022 | J94.8 | Other specified pleural conditions | 149.65 |
| 12344123123 | 3/7/2022 | J90 | Pleural effusion, not elsewhere classified | 114.14 |
| 12344123123 | 3/7/2022 | G47.33 | Obstructive sleep apnea (adult) (pediatric) | 78.93 |
| 12344123123 | 3/8/2022 | C80.1 | Malignant (primary) neoplasm, unspecified | 10.05 |
| 12344123123 | 3/8/2022 | J91.0 | Malignant pleural effusion | 221.73 |
| 12344123123 | 3/8/2022 | Z48.813 | Encounter for surgical aftercare following surgery on the respiratory system | 130.65 |
| 12344123123 | 3/8/2022 | J90 | Pleural effusion, not elsewhere classified | 114.14 |
| 12344123123 | 3/9/2022 | J91.0 | Malignant pleural effusion | 221.73 |
| 12344123123 | 3/9/2022 | J98.11 | Atelectasis | 240.75 |
| 12344123123 | 3/10/2022 | J91.0 | Malignant pleural effusion | 221.73 |
| 12344123123 | 3/10/2022 | J98.11 | Atelectasis | 240.75 |

| Patient ID | Treatment Date | ICD1 | ICD2 | ICD3 | ICD4 | Lienholder Response | Sys. Categorization | Sys. Explanation |
|---|---|---|---|---|---|---|---|---|
| 12344123123 | 10/24/2011 | 518.89 | 780.57 | V04.81 | | Denied-Agreed | Denied [Sys] | Treatment date 2011-10-24 is before the injury date 2024-07-01 |
| 12344123123 | 2/13/2022 | C80.1 | J91.0 | R91.8 | | Approved-Agreed | Approved [Sys] | |
| 12344123123 | 3/5/2022 | J94.8 | | | | Denied-Agreed | Denied [Sys] | |
| 12344123123 | 3/7/2022 | J90 | G47.33 | | | Approved-Agreed | Approved [Auditor] | |
| 12344123123 | 3/8/2022 | C80.1 | J91.0 | Z48.813 | J90 | Denied-Agreed | Denied [Auditor] | |
| 12344123123 | 3/9/2022 | J91.0 | J98.11 | | | Approved-Disagree | Denied [Sys] | |
| 12344123123 | 3/10/2022 | J91.0 | J98.11 | | | Denied-Disagree | Approved [Sys] | |

FIG. 8

SYSTEMS AND METHODS PREDICTING RELATIONSHIPS FROM DISPARATE DATA OBJECTS

FIELD

The present disclosure is related generally to identifying and extracting relationships between disparate data objects and, more particularly, to creating a machine learning mode trained to predict probabilistic relationships between disparate data objects.

BACKGROUND

Data mining can refer to a process of identifying and extracting relations and patterns in massive data sets involving methods at the intersection of machine learning (ML), statistics, and database systems. Data mining generally seeks to identify and extract these relations and patterns from data sets, opposed to extracting the data itself from the data sets. The extracted relations and patterns can be used for downstream applications, such as further analysis, ML, and predictive analytics.

SUMMARY

An aspect of the present disclosure is related to a method. The method includes obtaining a historical data structure that comprises data object pairs labeled with metadata, where the historical data object pairs comprise first data objects associated with second data objects that are disparate to the first data objects. The method also includes mapping a plurality of the first data objects to a plurality of the second data objects by linking each of the plurality of the first data objects to each of the plurality of the second data objects to generate data object pairs and encoding the links with weights. The weights can be determined by, for each data object pair, locating, in the historical data structure, a plurality of instances of the historical data object pairs corresponding to the data object pair, and determining a weight for the link associated with the data object pair based on tracking the metadata associated with each of the plurality of instances of the historical data object pairs. The method also includes building a weighted mapping comprising the data object pairs and associated weighted links, determining probabilistic relationships between a plurality of second input data objects and a first input data object by processing the first input data object and the plurality of second input data objects through the weighted mapping, and updating an input data structure comprising the plurality of second input data objects based on the probabilistic relationships.

Another aspect of the present disclosure is related to a system comprising a memory storing instructions and a processor communicably connected to the memory. The processor is configured to execute the instructions to obtain a historical data structure that comprises data object pairs labeled with metadata, where the historical data object pairs comprise first data objects associated with second data objects that are disparate to the first data objects. The processor is also configured to execute the instructions to map a plurality of the first data objects to a plurality of the second data objects by linking each of the plurality of the first data objects to each of the plurality of the second data objects to generate data object pairs and encoding the links with weights. The weights can be determined by, for each data object pair, locating, in the historical data structure, a plurality of instances of the historical data object pairs corresponding to the data object pair, and determining a weight for the link associated with the data object pair based on tracking the metadata associated with each of the plurality of instances of the historical data object pairs. The processor is further configured to execute the instructions to build a weighted mapping comprising the data object pairs and associated weighted links, determine probabilistic relationships between a plurality of second input data objects and a first input data object by processing the first input data object and the plurality of second input data objects through the weighted mapping, and update an input data structure comprising the plurality of second input data objects based on the probabilistic relationships.

BRIEF DESCRIPTION OF THE DRAWINGS

The present disclosure, in accordance with one or more various examples, is described in detail with reference to the following figures. The figures are provided for purposes of illustration only and merely depict typical, non-limiting aspects of such examples.

FIG. 4 illustrates an example of training data that can applied to the example architecture of FIG. 3, in accordance with an example.

FIG. 7 illustrates another example of input data that can applied the example architecture of FIG. 3, in accordance with an example.

FIG. 8 illustrates an example output that can be generated by the example architecture of FIG. 3, in accordance with an example disclosed herein.

Figure 1:
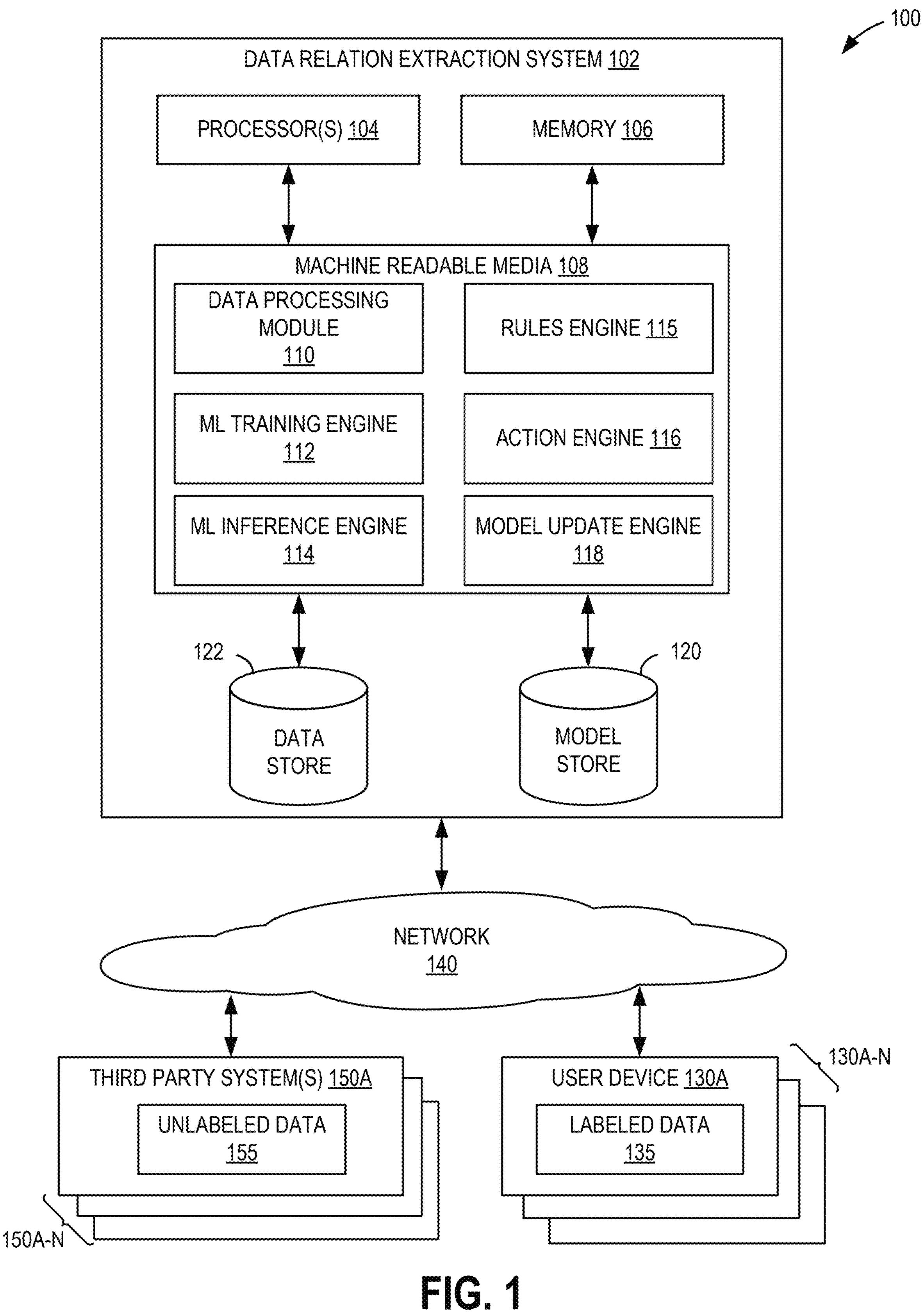
FIG. 1 schematically illustrates an example architecture in which the examples of the technology disclosed herein may operate.

The figures are not exhaustive and do not limit the present disclosure to the precise form disclosed.

DETAILED DESCRIPTION

As alluded to above, data mining tasks seek to extract previously unknown, interesting patterns in data sets. Some example techniques include cluster analysis, anomaly detection, association rule mining, and sequential pattern mining. For example, association rule mining can be used to uncover dependencies in a data set. However, certain conventional approaches rely on a basis for comparison contained within the data set itself. For example, cluster analysis groups objects according to similarity and thus requires some basis for similarity between comparable objects. Anomaly detection likewise relies on similarity analysis to identify objects that deviate from expectations. Association rule mining seeks to discover relationships between variables in a database, for example, by evaluating sets of transactions share overlapping subsets of variables. Thus, these conventional approaches rely on some relation or basis for comparison evident within the data sets themselves.

Examples of the present disclosure provide for systems and methods that can be executed to automatically identify and extract relationships between disparate data structures received from different sources. In examples, a first input data structure may be obtained from a first source and a second input data structure may be obtained from a second source. The first input data structure may include at least one data object (sometimes referred to herein as a first input data object(s)) and the second input data structure may include a plurality of data objects (sometimes referred to herein as second input data objects). The first input data object(s) may not be directly comparable or otherwise linked to the second input data objects, in that a relation cannot be readily determined from the data objects themselves. The input data objects can be applied to an ML model trained to predict relationships between the second input data objects and the first input data object(s). In examples, the ML model may compute a score for each second input data object that is a measure of relatedness between a respective second input data object and the first input data object(s). The measure may be provided, for example, as a probability that the second input data object is related to the first input data object. Examples herein may generate and tag each second input data object with a label based on respective scores. Examples herein may update the second data structure with the relationships between the first and second input data objects by tagging the second input data objects with the respective generated labels within the second data structure. The second data structure can be leveraged by downstream applications that process the labels, which embody the extracted relationships between the first and second data objects.

In examples, the ML model may comprise a weighted mapping of unique pairs of data object pairs, which can be used to compute the scores. For example, a training data set can be applied to an ML algorithm that builds the weighted mapping. The training data set may comprise numerous historical data object pairs tagged with metadata. A given historical data object pair may include a first data object and a second data object as a historical pair. The historical data object pairs may comprise multiple instances of a given first data object, as well as multiple instances of a given second data object. The historical pair may be associated with or otherwise tagged with metadata that includes one or more indicia (or labels) indicative of whether or not that the second data object is related to the first data object. Examples herein identify unique instances of the first and second data objects and maps each unique instance the first data objects to each instance of the second data objects to generate unique pairs. Examples generate links (or edge) for the unique pairs that connects each unique first data object to each second data object and encodes each link with a weight. The weight encoded onto a given link may be determined based on the metadata (e.g., the one or more indicia) associated with each historical pair corresponding to a respective unique pair located. The weighted mapping can be constructed using the unique pairs as and encoded links stored in a structured format.

In an example, the ML model may be utilized to determine scores for second input data objects by applying the first and second input data objects to the weighted mapping. For example, the ML model may map each second input data object to a first input data object, providing mapped input pairs. Each mapped input pair may be processed through the weighted mapping to determine a respective score. For example, a mapped input pair can be used to locate a unique pair in the weighted mapping that corresponds to (e.g., matches or is substantively similar to the mapped input pair). Once a unique pair is located, the weight encoded to the link corresponding to the located unique pair can be extracted and used to determine the score for the mapped input pair. As noted above, the score may be a measure (e.g., probability) the relationship between the second and first input data object of a mapped input pair In some examples, the disclosed technology may predict a relationship between the first and second data objects by thresholding the score. For example, the score can be compared to one or more thresholds (sometimes referred to as a score threshold(s)) to determine if the second data object is probabilistically related to the first data object. Based on the comparison, the second input data structure can be updated. In some example, the second input data structure can be updated by adding metadata to the second input data objects based on respective scores, such as by tagging the second input data objects with a label representative of a respective prediction. In another example, the second input data structure can be updated by deleting second input data objects that do not satisfy the one or more thresholds.

FIG. 1 is a block diagram illustrating an example environment 100 in which the examples disclosed herein may operate. The example environment 100 includes a data relation extraction system 102, which comprises one or more processor(s) 104, memory 106, and machine-readable media 108. Data relation extraction system 102 may be implemented as a server computer that communicates via network 140 to other devices accessible on the network, including one or more user devices 130A-130N (collectively referred to as user devices 130) and one or more third party systems 150A-150N (collectively referred to as third party systems 150). System 102 may receive labeled data 135 from client device 130 and unlabeled data 155A-155N (collectively referred to as unlabeled data 155) from third party systems 150.

Data relation extraction system 102 may host and/or execute one or more of the various functions, processes, and/or methods described herein. Data relation extraction system 102 may comprise one or more dedicated servers, or may comprise cloud instances, which utilize shared resources of one or more servers. Data relation extraction system 102 may also comprise or be communicatively connected to one or more databases, such as data store 122 and model store 120.

Network 140 may include the Internet, and data relation extraction system 102 may communicate with user devices 130 through the Internet using standard transmission protocols, such as HyperText Transfer Protocol (HTTP), Secure HTTP (HTTPS), File Transfer Protocol (FTP), FTP Secure (FTPS), SSH FTP (SFTP), and the like. While Data relation extraction system 102 is illustrated as connected to various systems through a single network 140, it should be understood that Data relation extraction system 102 may be connected to the various systems via different sets of one or more networks. For example, Data relation extraction system 102 may be connected to a subset of user systems 130 and/or third party systems 150 via the Internet, but may be connected to one or more other user devices 130 and/or third party systems 150 via an intranet. Network 140 may also include any wired or wireless network, for example, a cellular network (e.g., 3G, 4G LTE, 5G, etc.), local area network (LAN), wide area network (WAN), etc.

User devices 130 may comprise any type of computing devices capable of wired and/or wireless communication, including, without limitation, desktop computers, laptop computers, tablet computers, smart phones or other mobile phones, wearable mobile devices, servers, game consoles, televisions, set-top boxes, electronic kiosks, and the like. User devices 130 may be one or more end-user devices operating as a front-end system through which an end-user may interact with or otherwise utilize data relation extraction system 102.

Data relation extraction system 102 may comprise web servers configured to host one or more websites, web services, and/or web-based applications. In examples in which a website is provided, the website may comprise one or more user interfaces, including, for example, webpages generated in HyperText Markup Language (HTML) or other language. Data relation extraction system 102 transmits or serves these user interfaces in response to requests from user devices 130. In some examples, these user interfaces may be served in the form of a wizard, in which case two or more user interfaces may be served in a sequential manner, and one or more of the sequential user interfaces may depend on an interaction of the users or user devices 130 with one or more preceding user interfaces. The requests to data relation extraction system 102 and the responses from data relation extraction system 102, including the user interfaces, may both be communicated through network 140. These user interfaces or web pages may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases that are locally and/or remotely accessible to data relation extraction system 102. Data relation extraction system 102 may also respond to other requests from user devices 130.

As alluded to above, data relation extraction system 102 may comprise, be communicatively coupled with, or otherwise have access to one or more database(s). For example, data relation extraction system 102 may comprise or have access to databases 122 and 120. A user device 130 or module/engine executing on data relation extraction system 102 may submit data to be stored in data stores 122 and/or 120, as well as request access to data stored in data stores 122 and/or 120. Any suitable database may be utilized, including without limitation MySQL™, Oracle™ IBM™, Microsoft SQL™, Sybase™, Access™, and the like, including cloud-based database instances and proprietary databases. Data may be sent to data relation extraction system 102, for instance, using POST requests supported by HTTP, via FTP, etc. This data, as well as other requests, may be handled, for example, by server-side web technology, such as a servlet or other software module, executed by data relation extraction system 102.

In such examples, data relation extraction system 102 may provide an application programming interface (API) which defines the manner in which user system(s) 130 and/or third party system(s) 150 may interact with data relation extraction system 102. Thus, user system(s) 130 and/or third party system(s) 150 (which may each themselves be servers) can define their own user interfaces and rely on the web services to implement or otherwise access the backend processes, methods, functionality, storage, etc., described herein. For example, in such an implementation, one or more user devices 130 may interact with a software module or engine executing on data relation extraction system 102 to execute one or more or a portion of one or more of the various functions, processes, methods, and/or software modules described herein. User device 130 may be "thin," in which case processing is primarily carried out server-side by data relation extraction system 102. A basic example of a thin client application is a browser application, which simply requests, receives, and renders webpages at user devices 130, while the server application on data relation extraction system 102 can be responsible for generating the webpages and managing database functions. Alternatively, the client application may be "thick," in which case processing is primarily carried out client-side by user devices 130. It should be understood that the user devices 130 may perform an amount of processing, relative to data relation extraction system 102, at any point along this spectrum between "thin" and "thick," depending on the design goals of the particular implementation. In any case, the examples described herein, which may wholly reside on either data relation extraction system 102 or user device(s) 130 or be distributed between data relation extraction system 102 and user system(s) 130.

Processor(s) 104 may comprise a general-purpose or special-purpose processing engine such as, for example, a microprocessor, controller, or other control logic. Processor(s) 104 may be connected to a bus, although any communication medium can be used to facilitate interaction with other components of data relation extraction system 102 or to communicate externally. Processor 104 may fetch, decode, and execute instructions to control processes or operations disclosed herein. As an alternative or in addition to retrieving and executing instructions, processor 104 may include one or more electronic circuits that include electronic components for performing the functionality of one or more instructions, such as a field programmable gate array (FPGA), application specific integrated circuit (ASIC), or other electronic circuits.

Memory 106 may comprise random-access memory (RAM) or other dynamic memory for storing information and instructions to be executed by processor(s) 104. Memory 106 might also be used for storing temporary variables or other intermediate information during execution of instructions to be executed by processor(s) 104. Memory 106 may also comprise a read only memory ("ROM") or other static storage device coupled to a bus for storing static information and instructions for processor(s) 104.

Machine-readable media 108 may be any electronic, magnetic, optical, or other physical storage device that contains or stores executable instructions. Thus, machine-readable storage medium 108 may be, for example, RAM, non-volatile RAM (NVRAM), an Electrically Erasable Programmable Read-Only Memory (EEPROM), a storage device, an optical disc, and the like. In some examples, machine-readable storage medium 108 may be a non-transitory storage medium, where the term "non-transitory" does not encompass transitory propagating signals.

Machine-readable media 108 may comprise one or more interfaces, circuits, engines, and modules for implementing the functionality discussed herein. Machine-readable media 108 may carrying one or more sequences of one or more instructions processor(s) 104 for execution. For example, an interface, circuit, engine, or module may comprise a set of instructions that, when executed by the processor(s) 104, cause the processor(s) to perform the features or functions disclosed herein. As such, instructions embodied on machine-readable media 108 may enable data relation extraction system 102 to perform features or functions of the disclosed technology as discussed herein. For example, the interfaces, circuits, engines and modules of machine-readable media 108 may comprise, for example, data processing module 110, ML training engine 112, ML inference engine 114, rules engine 115, action engine 116, and model update engine 118.

Data processing module 110 may be configured to receive data from third party system(s) 150 and/or user device(s) 130. The format of the data may comprise a structured format comprising various data objects or elements, such as but not limited to, JSON (JavaScript Object Notation), XML (extensible Markup Language), Excel, CSV (Comma-Separated Values), or the like. In some examples, the data can be ingested by receiving the data and storing the data to data store 122. In some examples, the data can be transmitted via network 140 to data relation extraction system 102 and processed by data processing module 110. The transmission of the data may be transmitted using different protocols like HTTP, MATT, or other protocols specific to the application or industry of the particular implementation. In various examples, the data can be encrypted during transmission, for example, according to Transport Layer Security (TLS) protocols. Additionally, in some examples, the data may be decrypted upon receipt and encrypted according to a different protocol for storage. For example, the data may be encrypted for storage to data store 122 using Advanced Encryption Standard (AES) protocols (e.g., AES-256 or the like).

In some examples, the data received by the data processing module 110 may be unlabeled data. For example, data processing module 110 may receive unlabeled data 155 from third party system(s) 150. Unlabeled data 155 may include certain information that is added during creation at the third party system(s) 150 or during transmission of the unlabeled data 155. The certain information added during creation and/or transmission may not correspond to a label added by data relation extraction system 102 later in the process. Instead, the label added by data relation extraction system 102 may be representative of predicted relationships between unlabeled data 155 received from different third party systems 150. The predicted relationships and labels added by the data relation extraction system 102 may not be generated based on or using the certain information included with the unlabeled data 155. Instead, the predicted relationships can be determined by data relation extraction system 102 through analysis and processing of the unlabeled data 155, and the label added by data relation extraction system 102 may not be provided with the unlabeled data 155 received by data relation extraction system 102.

In some examples, data processing module 110 may be configured to obtain labeled data and store the labeled data to data store 122 a training data set. For example, data processing module 110 may receive labeled data 135 from user device(s) 130 and/or third party system(s) 150. The labeled data 135 may comprise a historical data structure consisting of historical data object pairs associated with metadata added by the user device(s) 130 and/or third party system(s) 150. In examples, a given historical data object pair may include a first data object (or element) and a second data object (or element) and the associated metadata may include one or more indicia of a relationship between the first and second data objects. For example, a user of a user device 130 may evaluate a historical data object pair according to domain-specific subject matter expertise and certain additional information included with the first and second data objects (e.g., descriptions provided in human readable language) to determine whether or not the second data object is related to the first data object. The user may operate a user device 130 to add an indicator of the determination. The first data objects and second data objects constituting the historical data object pairs, along with the added metadata, may be received by the user device(s) 130 from different third party systems 150. In some examples, the third party systems 150 may also added metadata to the historical data object pairs using their own domain-specific subject matter expertise and the certain additional information.

In some examples, the data processing module 110 may be configured to execute extract, transform, load (ETL) processes, whereby data received from the third party systems 150 can be extracted from a received transmission, transformed, and loaded to a destination, such as data store 122. For example, the data processing module 110 may extract the unlabeled data 155 from a data transmission and store the extracted data as temporary variables or intermediate information. The data processing module 110 may be configured to perform data transformation to the extracted data to ensure that only properly formatted data is loaded to the destination. For example, unlabeled data 155 may be encrypted according to encryption protocols and data processing module 110 may decrypt the encrypted data. The decrypted data may processed by selecting relevant data objects; translating coded values; encoding free-form values; deriving calculated values; transposing/pivoting columns to rows or vice versa; splitting a column to multiple columns; validating relevant data; data cleansing to identify and correct (or remove) corrupt, inaccurate, or irrelevant data; among other transformation techniques as known in the art. The resulting transformed data can then be loaded to a destination, for example, data store 122. In some examples, data stored to data store 122 may be encrypted.

ML training engine 112 may be configured to train a supervised ML model. For example, ML training engine 112 may train a supervised ML model to predict relationships between disparate unlabeled input data objects. The supervised ML model may be trained by applying training data sets of labeled data 135 to one or more ML algorithms. This training allows the ML model to recognize patterns and ultimately operate autonomously to without using labels.

In some examples, the supervised ML model may correspond with linear regression, decision trees, support vector machines, neural networks, or other supervised ML models. Training the supervised ML model may begin by initializing the one or more ML algorithms with random or predefined parameters that can be adjusted during the training. When a label is input to the supervised ML model (e.g., by accessing data store 122), the process iteratively adjusts the parameters of the ML algorithm to minimize the difference between its predictions and the true labels.

In an example, the supervised ML model may be trained to identify relationships in unlabeled data objects by building a weighted mapping of data object pairs. For example, the ML training engine 112 may apply training data sets of labeled data 135 to an ML algorithm that learns unique pairs from historical data object pairs and determines weights for the unique pairs. The ML training engine 112 may initialize the weights using random or predefined values, which can be adjusted during training. The weights may represent a measure (e.g., a probability) of a relationship between data objects of the unique pairs. In examples, a data object may refer to a JSON object, XML data source object, a value or element stored to a cell of a table stored in Excel format, a value or element stored in CSV format, and the like.

In an illustrative example, the ML training engine 112 may be configured to identify and map unique instances of first data objects to unique instances of second data objects from the historical data object pairs to generate unique pairs. For example, the ML training engine 112 may access historical data object pairs from a training data set and identify unique instances of first and second data objects. The ML training engine 112 can extract the unique instances and map each unique instance of first data objects to each unique instance of second data objects, for example, by creating links that connect the unique instances of first data objects to unique instances of second data objects.

The ML training engine 112 can be configured to learn weights for each link by tracking metadata across multiple instances of the unique pairs. For example, as noted above, each historical data object pair can be associated with metadata, for example, that tags each historical data object pair with one or more indicia (or labels) indicative of a relationship of the historical data object pair. Within the training data set, there may be multiple instances of historical data object pairs corresponding to a given unique pair (e.g., first and second data objects constituting an instance corresponds to, is similar to, or otherwise matches the first and second data object constituting a unique pair). The multiple instances may each be tagged with one or more indicia. The ML training engine 112 may locate the multiple instances and accumulate the one or more indicia from the multiple instances. The ML training engine 112 may compute a weight for the unique pair by aggregating the accumulated one or more indicia according to an algorithm (an example of which is provided below in connection with FIG. 3). The ML training engine 112 may encode the link created for the unique pair with the weight.

The trained supervised ML model may be stored in a model store 120 as a trained ML model. For example, the ML training engine 112 can build the weighted mapping by creating a data structure (sometimes referred to as a weighted mapping data structure) that includes the mapped unique pairs and encoded links. The weighted mapping can be stored to model store 120 according to a structured format, as described above. The trained ML model may be used during an inference process when new unlabeled data is received by the data relation extraction system 102.

ML inference engine 114 can be configured to initiate an inference process using the trained ML model accessed from in model store 120. The trained ML model may make predictions and/or generate outputs for new, incoming unlabeled data. For example, once the supervised ML model is trained, the ML model can be deployed for inference of the new unlabeled data 155.

The inference process may comprise, for example, providing the new unlabeled data 155 to the trained model as input. The processing of the data may vary based on the type of ML model to be associated with the unlabeled data 155. For example, in a neural network, the ML model may receive the unlabeled data as input and process it through the layers of the neural network to generate output. The output of the neural network may provide determined similarities between previously received training data and new unlabeled data (e.g., whether the new data is similar or not similar to the previously received data with respect to a similarity threshold). In decision trees, the model may receive the unlabeled data 155 as input and process it through its decision boundaries. In clustering, the ML model may apply the learned patterns and relationships determined during training to the new unlabeled data to generate clustered data with the highest probability of corresponding with the unlabeled data, and group each set of similar data in the common cluster. In any of these implementations, the ML model may generate a prediction as output of the unlabeled data.

In various examples, the ML inference engine 114 can be configured to provide unlabeled data 155 from multiple sources as input to the trained ML model and process the unlabeled data 155 through the weighted mapping to generate an output. The output may provide determined likelihoods that unlabeled data 155 from one source is related to unlabeled data 155 from another source. The output may be used to generate labels indicative of the determined likelihoods, which can be assigned to unlabeled data (e.g., used to tag unlabeled data as metadata).

For example, the inference process may output a determined likelihood that first unlabeled data 155A is related to second unlabeled data 155B. In this case, the first unlabeled data 155A may be obtained from third party system 150A and the second unlabeled data 155B may be obtained from third party system 150B, each of which can be stored to data store 122. The first unlabeled data 155A may be transmitted in a structured format comprising first input data objects (or elements). Likewise, second unlabeled data 155 may be stored in a structured format comprising second input data objects (or elements), which may not be directly comparable or otherwise linked to the first input data objects. The ML inference engine 114 may apply the first and second input data objects to the trained ML model, processes the first and second input data objects through the weighted mapping to determine a likelihood (e.g., a probability) that second input data objects are related to first input data objects.

In examples, the likelihood that that second input data objects are related to first input data objects may be determined by computing a score using the weighted mapping. For example, the ML inference engine 114 may map or otherwise associate each second input data object to a first input data object and process the mapped input pairs through the weighted mapping. The ML inference engine 114 can use the mapped input pair to locate a unique pair corresponding to (e.g., similar to or otherwise matching) the mapped input pair from within the weighted mapping. The ML inference engine 114 can identify and extract a weight encoded to the link associated with the located unique pair and determine the score for the mapped input pair from the extracted weight. The score may represent a measure of a relationship between the second and the first input data object of the mapped input pair (e.g., a probability that the second input data object is related to the first input data object). The inference process can be performed for each mapped input pair to provide scores on a per-mapped input pair basis.

In some examples, the ML inference engine 114 may be configured to use the score for thresholding predictions. For example, for a given mapped input pair, the ML inference engine 114 may compare the score to one or more score threshold(s) and output a determined prediction based on satisfying the one or more score thresholds. As an illustrative example, if the score is equal to or greater than a first score threshold, then the ML inference engine 114 may predict that the second input data object is related to the first input data object. As another example, if the score is equal to or less than a second score threshold, then the ML inference engine 114 may predict that the second input data object is unrelated to the first input data object. The second score threshold may be lower than the first score threshold, which may define upper and lower bounds for making probabilistically confident predictions. Thus, if the score lies between the first and second score thresholds, the ML inference engine 114 may not be able to predict and relationship (e.g., unable to make a confident prediction) and elicit feedback from an operator.

The ML inference engine 114 may also be configured to generate a label for mapped input pairs, which can be assigned to or otherwise used to tag unlabeled data 155. For example, where the ML inference engine 114 predicts a second input data object is related to a first input data object, the ML inference engine 114 may generate and assign a label representative of the determined prediction to the second input data object. Likewise, where the ML inference engine 114 predicts a second input data object is unrelated to a first input data object, the ML inference engine 114 may generate and assign a label representative of such to the second input data object. If the ML inference engine 114 is unable make a prediction, the ML inference engine 114 may abstain from generating a label or may generate and assign a label that elicits feedback from the operator. The label determined during the inference process may be stored in data store 122 as metadata associated with the unlabeled data comprising the second data objects.

Rules engine 115 can be configured to override score determinations based on operator-defined rules (or policies). Rules engine 115 may hold operator-defined rules that specify conditions that may operate to negate a score or otherwise indicate that mapped input pairs are unrelated regardless of the score. For example, rules engine 115 may define timing conditions that, if not satisfied, classify the second input data object as unrelated to the first input data object, regardless of the score determined by the ML inference engine 114.

Action engine 116 can be configured to initiate an action in association with the unlabeled data 155 received from third party systems 150. For example, a data structure received as unlabeled data 155 can be updated based on predictions made by the ML inference engine 114. In some examples, the action may be to add labels of predictions to data objects of a data structure received from a third party system 150. For example, labels assigned to the second input data objects can be added to the second input data structure, thereby indicating relations between the second input data objects and the first input data objects. In another example, the action may be to execute one or more deletion operations that automatically removes second input data objects from the unlabeled data that the ML inference engine 114 predicted as unrelated to the first input data object.

In some examples, the action may include updating an application programming interface (API), dashboard, or other user interface. For example, the action may be include automatically (e.g., responsive to) prompting or triggering a user interface of an operator for feedback on second input data objects for which a prediction was not possible. As another example, the action may include transmitting an updated second input data structure to its source (e.g., the third party system 150 that originated the second input data structure).

Model update engine 118 may be configured to review output from the supervised ML model and, in some examples, validate or update the results from the model. In some examples, the model update engine 118 may initiate a label validation process. During the label validation process, model update engine 114 may revise labels associated with particular data object or add data labels thereto. For example, as described above, a score that does not satisfy the one or more score thresholds may be provided for further review. In some examples, additional labels may be added by a human user to output from the supervised ML model.

In some examples, the labels that are determined during the label validation process may be provided back to the supervised ML model to retrain the model during a subsequent training process. The subsequent training process may be executed to update the parameters of the ML model (e.g., the weights as described above). The retrained supervised ML model may be stored in model store 120 and/or provided for future inference processes on new unlabeled data 155.

Figure 2:
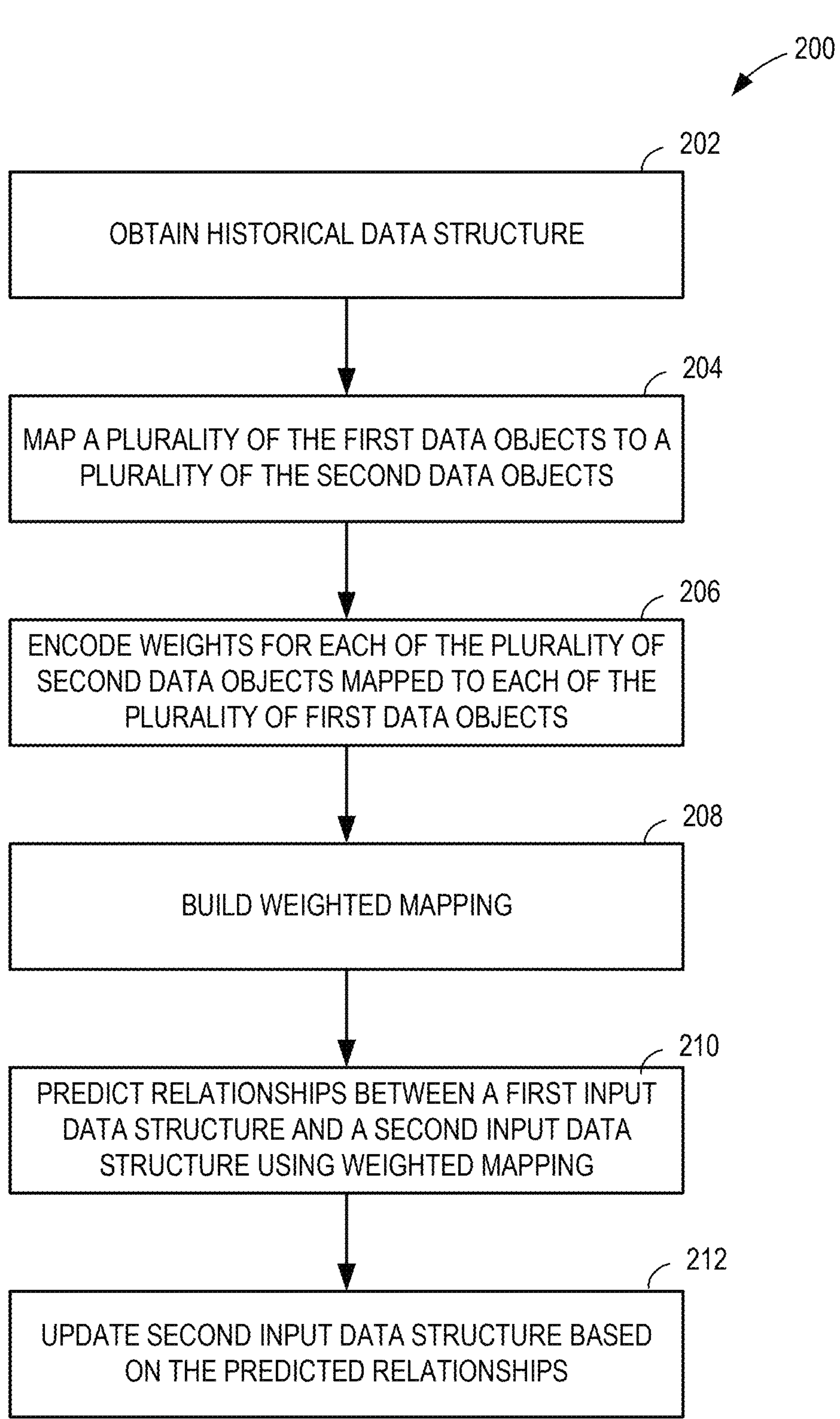
FIG. 2 illustrates a method for determining inter-data relationships between disparate unlabeled data, in accordance with various examples of the disclosed technology.

FIG. 2 illustrates a method 200 for determining relationships between disparate unlabeled data, in accordance with various examples of the disclosed technology. Method 200 may be executed, for example, by a computing component, such as a server computer, a controller, or any other similar computing component capable of processing data. In the example implementation, the method 200 may be stored as instructions in machine-readable storage medium that can be executed by a hardware processor, for example, the method 200 may be stored as instructions in machine-readable storage 108 and executed by processor(s) 104.

At block 202, a historical data structure can be obtained and used as training data. The historical data structure may comprise historical data object pairs and associated metadata. Each historical data object pair may comprise a first data object associated with a second data object. The metadata may tag the historical data object pairs with one or more indicia of a relationship between the first data object and second data object of a respective pair. The historical data structure can include multiple instances of a respective (or matching) historical data object pairs tagged with the same or different one or more indicia. The historical data structure may be accessed from a database, such as data store 122 of FIG. 1.

At block 204, a plurality of the first data objects can be mapped to a plurality of the second data objects. For example, the historical data structure can be processed to identify and extract unique instances of first data objects and unique instance of second data objects from amongst the historical data object pairs, thereby retrieving a plurality of the first data objects (e.g., unique instances thereof) and a plurality of the second data objects (e.g., unique instances thereof). The plurality of the first data objects can be mapped to the plurality of the second data objects (e.g., unique pairs) by creating links that connect each of the plurality of first data objects to each of the plurality of second data objects.

At block 206, the links can be encoded with weights indicative of relationships between each of the plurality of second data objects and each of the plurality of first data objects. As noted above, the historical data structure may include multiple instances of a unique pair generated at block 204. Each of these multiple instances can be associated with respective metadata. That is, each instance may be labeled with one or more indicia that the data objects of a respective unique pair are related. For a given unique pair (block 204), the historical data structure can be searched to locate the multiple instances corresponding thereto and the weights can be determined based on tracking the one or more indicia across the located instances. For example, the one or more indicia of the located instances can be extracted and aggregated to derive a weight for the given data object pair. This weight can be encoded onto the link associated with the given data object pair.

At block 208, a weighted mapping can be built from the unique pairs (block 204) and associated weighed links (block 206). For example, the unique pairs and associated links can be inserted into a data structure stored in a structured format (e.g., JSON, XML, Excel, CSV, or the like). The first and second data objects constituting a respective unique pair can be stored as values or data elements of the data structure, which can be associated together using a respective encoded link. The weighted mapping can be stored to a database, for example, model store 120.

At block 210, the weighted mapping can be used to identify and extract relationships between a first input data structure and a second input data structure. For example, a first input data structure can be received from a first third party system and comprises one or more first input data objects. The second input data structure can be received from a second third party system that is different from the first third party system and comprises a plurality of second input data objects. Block 210 can be executed to determine (e.g., predict) a likelihood that second input data objects are related to the first input data object(s). For example, block 210 may include processing the first and second input data structures through the weighted mapping to determine scores for the plurality of second input data objects. The scores may represent a measure (e.g., probability) that the second input data objects are related to the first input data object(s).

As an illustrative example, at block 210, each second input data object can be mapped to (or otherwise associated with) a first input data object. The resulting mapped input pairs can be applied to the weighted mapping. For example, a respective mapped input pair can be used to locate a corresponding unique pair (e.g., similar to or otherwise matching to the input data object pair) from within the weighted mapping. A weight encoded to the link associated with the located unique pair can be extracted and used to determine the score for the mapped input pair. The score may represent a measure of a relationship between the second and the first input data object of the mapped input pair (e.g., a probability that the second input data object is related to the first input data object). Block 210 can be performed for each input data object pair to provide scores on a per-mapped input pair basis.

At block 212, the second input data structure can be updated based on the scores determined at block 210. For example, block 212 may include predicting relationships between the second input data objects and first input data object(s) based on the scores. In an example, block 212 may include generating a label for each mapped input pair using the scores. The labels can be assigned to or otherwise used to tag the second input data objects to store and indicate the probability that the second input data object is related to the first input data object(s).

In some examples, block 212 may include thresholding predictions based on the score. For example, for a given mapped input pair, the score can be compared to one or more score threshold(s) to output a determined prediction based on satisfying the one or more score thresholds. As an illustrative example, if the score is equal to or greater than a first score threshold, then block 212 may determine that the second input data object is probabilistically related to the first input data object. If the score is equal to or less than a second score threshold, then block 212 may predict that the second input data object is probabilistically unrelated to the first input data object. In some examples, if the score lies between the first and second score thresholds, the block 212 may be determine that the relationship therebetween cannot be probabilistically determined and elicit feedback from an operator. The label generated by block 212 can may indicate that the second input data object is related to, unrelated to, or that a relationship is undeterminable to the first input data object(s).

In some examples, block 212 may apply operator-defined rules that may operate to override a score. For example, operator-defined rules may specify conditions that negate a score or otherwise indicate that input data objects are unrelated regardless of the score. In this case, block 212 may generate a label indicative that the second input data object is unrelated to the first input data object(s), irrespective of the score.

In some example, block 212 may filter the second data object based on the score (or based on a label generated according to the score, where applicable). For example, block 212 may execute a deletion operation that automatically removes second input data objects that are determined to be unrelated to the first input data object, for example, based on the score or an assigned label. In another example, block 212 automatically (e.g., responsive to) prompt or trigger a user interface of an operator for feedback on second input data objects for which a prediction was not possible. Block 212 may also transmit the updated second input data structure to the second third party system that originated the second input data structure.

It may be useful to describe an illustrative example application in which the systems and methods disclosed herein may be implemented. In a particular example, the systems and methods described in connection with FIGS. 1 and 2 may be implemented to extract relationships for automated lien resolution. For example, an automated lien resolution and management platform may utilize relationships between disparate data structures to automate lien resolution processing.

As background, lien resolution often requires a detailed process of addressing and negotiating claims made by healthcare providers, government agencies, insurance plans, and other entities (referred to herein as lien holders). The liens generally manifest as legal fees or previous debts for each claim to be applied against a portion of a settlement in a personal injury case. These liens must be resolved to ensure that settlement funds are distributed to injured parties (sometimes referred to as claimants) free of any future liens by lien holders. Failure to resolve liens correctly can lead to significant consequences for parties involved. In general, lien resolution involves identifying the liens, auditing and negotiating the lien amounts, and dispersing lien amounts to lien holders and remaining settlement funds to an injured party.

Conventionally, a lien resolution service may operate as a middle man between settlement funds and lienholder for resolving any liens on the settlement. A lien resolution service may receive a spreadsheet, either physical paper or through e-mail, containing claimant information related to a settlement. Claimant information can include personal information identifying injured persons related to the settlement and injury information specifying the injury. The lien resolution service would then send the claimant information to lien holders, again via physical paper or e-mail. The lien holders go through the claimant information to identify any claimants (e.g., persons) who have liens with the lien holders. The lien holders send back lien information for those identified claimants, which may be spreadsheet(s) specifying claimants and a total lien amount. The spreadsheet may also include a line-by-line breakdown of a number of liens, including the claim (e.g., diagnosis, procedures, drugs, or other claims) and amounts that make up the total lien amount. Each lien includes also includes a description that specifies what constitutes the claim. The lien resolution service examines each description of each claim, line-by-line, to determine if a given lien is to be dispersed from the settlement. Conventionally, this examination process includes human auditors that manually review the description for each claim, which is provided as a natural human readable description of the diagnosis and/or procedures performed constituting the claim, to determine if the lien is related to the injury or not. The determinations would be returned to the lien holder, who make their own determinations and return agreements or disagreements with the lien resolution service determinations. This negotiation is repeated numerous times through manual, line-by-line review of the lien descriptions, until both the lien resolution service and lien holders are in agreement. The total lien amount can then be reduced according to the determinations and funds dispersed in accordance with the determinations.

As noted alluded to above, conventional approaches to lien resolution involve detailed and tedious manual review, line-by-line, of lien descriptions. Conventional review of the liens focus on the human readable description of the claims (e.g., diagnosis, procedures, etc.) because this information is more readily understood by human auditors. While diagnosis, procedures, etc. can be associated with standardized statistical codes, there are hundreds of thousands different diagnosis, procedures, etc., such that correlating a code to an injury would not be practical for a human, let along feasible. Furthermore, while these codes have been standardized, there are many varying families of codes and different regions may utilize codes standardized to their specific region, which further complicates the practicality of a human auditor readily understanding whether a claim is related to an injury from standardized statistical codes. Instead, human auditors can quickly read and understand a description to evaluate whether the claim is related to the injury.

Additionally, modern personal injury settlements can involve hundreds, if not thousands, of claimants, each of which may have hundreds or thousands of individual claims constituting liens on the settlement. Thus, modern lien resolution services must evaluate hundreds of thousands claims, line-by-line, to resolve any liens on a modern settlement. This alone, not including other statutory and regulatory requirements, can take weeks if not months for a team of human auditors to perform, let alone a single auditor. Additionally, the legal and financial consequence for failures and errors in resolving the lien correctly can increase scrutiny applied during the lien resolution process, which further delays resolution.

Furthermore, negotiations between lien holders and lien resolution services can require numerous communications exchanges of claims and determinations. As noted above, these communications are performed conventionally using physical paper or e-mail. The back and forth can be a bottleneck that further delays the time until liens are resolved, as well as potentially function as choke points for increased errors and inconsistencies.

Against this backdrop, the examples disclosed herein can provide for an automated lien resolution and management platform that leverages relationships between claimant information and lien information that can be identified and extracted using an ML model in accordance with the examples described in connection with FIGS. 1 and 2. For example, claimant information may be provided as a first input data structure, which comprises injury data related to a settlement as a first input data object. The lien information may be provided as a second input data structure, which comprises a claim data for a claimant party to the settlement as second input data objects. The lien data may include data representative of a plurality of claims, which can be specified using coded identifiers (ID) of the claims (e.g., diagnosis, procedures, drugs, and the like) constituting the liens. The injury data and lien data can be applied to the ML model, which predicts relationship classifications for the lien data. For example, the ML model can be trained to classify the coded IDs as probabilistically related to the injury data. The lien information (as the second input data structure) can be updated based on the predicted classifications, for example, by generating and labeling each claim of the lien data with a predicted classification. A lien resolution report can be generated from the updated lien information and provided to lien holders for resolving the lien.

By leveraging the ML model, trained in accordance with the examples herein, the automated lien resolution and management platform provides a computer-centric approach to lien resolution. Particularly, the examples herein forgo relying on descriptions provided in human understandable language, instead discovering relationships between coded IDs and injury data. This approach can provide improved accuracy with decreased delays in evaluating hundreds of thousands of claims in view of a specified injury. This approach can reduce inaccuracies due to human interpretations of descriptions, as well as reduce overall failures or errors in the lien resolution process. Furthermore, by automating lien resolution through a trained ML model, negotiations between lien holders and lien resolution services can be streamlined to reduce the communication exchanges therebetween. Through continued training and model updates, occurrences of disagreements between the lien resolution service and lien holders can be minimized, if not fully avoided, thereby reducing the overall communication between entities needed to fully resolve a lien.

Figure 3:
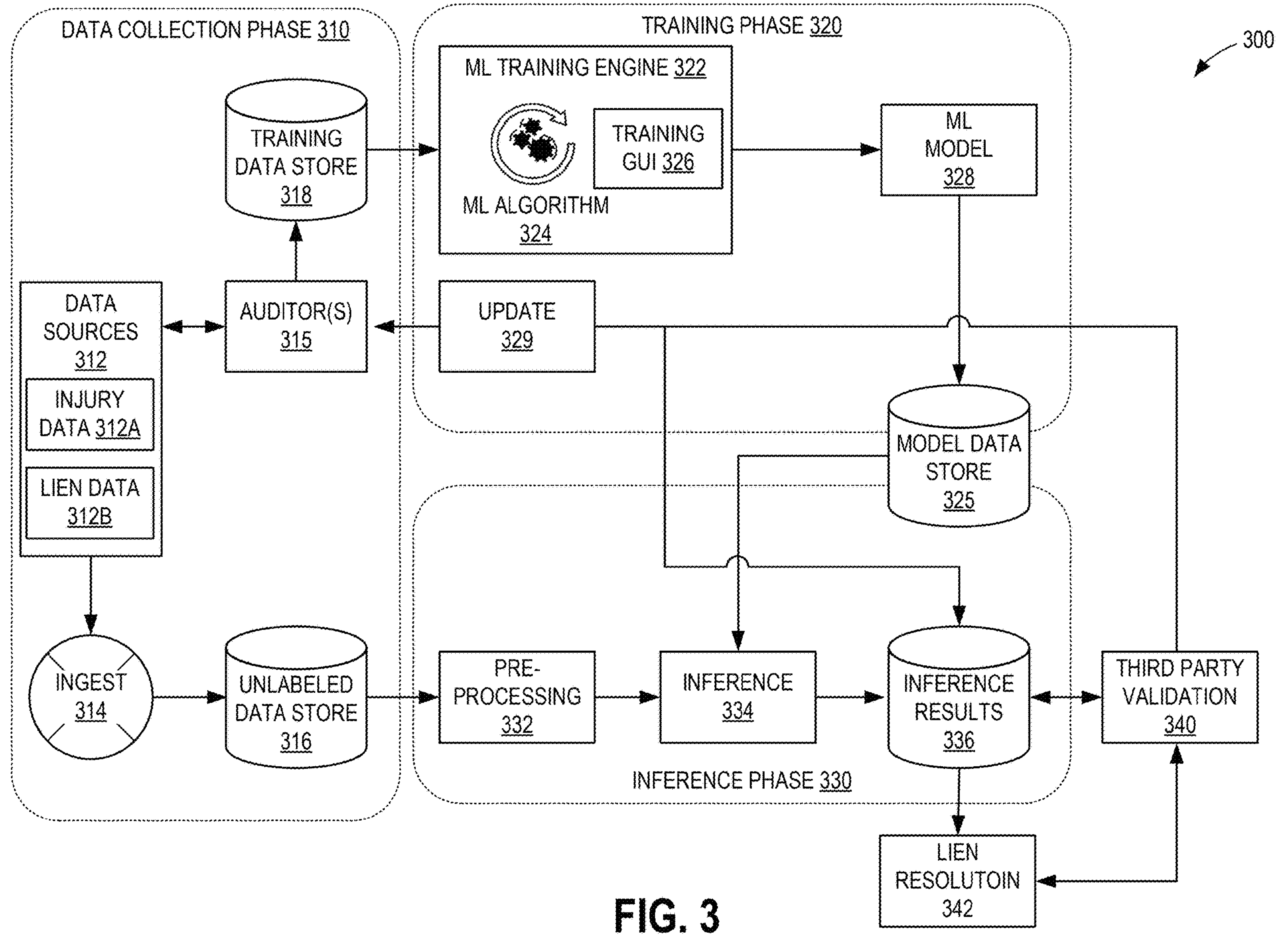
FIG. 3 is a schematic block diagram of a process flow for an example architecture utilizing examples of the disclosed technology.

FIG. 3 is a schematic block diagram of a process flow of an example platform for automated lien resolution, in accordance with the examples disclosed herein. FIG. 3 illustrates automated lien resolution platform 300, which may be comprises one or more of the components data relation extraction system 102 of FIG. 1. Thus, automated lien resolution platform 300 can be configured to perform at least some of the functionality described in connection with FIGS. 1 and 2 as part of the process flow. For example, automated lien resolution platform 300 comprises a preprocessing module 332, an ML training engine 322, and an update engine 329, each of which may be substantially similar to data processing module 110, ML training engine 112, and model update engine 118 of FIG. 1, respectively. Automated lien resolution platform 300 also includes an inference engine 334, which may substantially similar to one or more of ML inference engine 114, rules engine 115, and action engine 116 of FIG. 1.

Automated lien resolution platform 300 can be configured to leverage relationships extracted using a trained ML model for automated lien resolution over the course of a collection phase 310, a training phase 320, and an inference phase 330. During the collection phase 310, automated lien resolution platform 300 stores a training data set to training data store 325 based on historical lien resolutions. The training data set may include pairs of injuries and claims labeled with indicia of pair relatedness (e.g., metadata associated with the pairs). During the training phase 320, an ML model 328 can be trained on the training data set and stored to a model store 325 (e.g., an example of model store 120). Prior to the inference phase, automated lien resolution platform 300 obtains incoming injury data 312A and lien data 312B and commits the data to unlabeled data store 316. During the inference phase, unlabeled data 316, comprising incoming injury data 312A and lien data 312B, can be applied to the trained ML model 328 as inputs. The trained ML model 328 predicts a probabilistic relationship between unlabeled injury data 312A and unlabeled lien data 312B. The inference phase 330 can update the lien data 312B based on the predictions, for example, by tagging the lien data 312B with labels generated from the predictions.

As alluded to above, during the collection phase 310 and in preparation for the training phase 320, automated lien resolution platform 300 obtains historical lien resolutions, for example, from multiple data sources 312. For example, over time, historical determinations on whether claims are related to injuries can be collected, for example, from historical lien resolutions activities. That is, for example, multiple data sources 312, which may include one or more sources of lien information (e.g., lien holders) and one or more sources of claimant information (e.g., personal injury law firms), may generate and provide claimant information comprising injuries and lien information comprising various claims to auditors 315. The auditors 315 examine descriptions of the claims included in the lien information to determine if a given claim/injury pair are related. The auditors 315 may add a label to each claim/injury pair as an indicator of the determination, for example, by "related" (e.g., claim is approved as related to the injury) or "unrelated" (e.g., claim is rejected as unrelated to the injury). The auditors may operate a graphical user interface (GUI) to input the labels, which the GUI adds to the claim/injury pair. As described above, through negotiations with the source(s) 312 of lien information, the determinations can be agreed to or disagreed with. Additional labels can be added to each claim/injury pair as indicators of the negotiations, for example, "agreed" (e.g., agreement with the auditor's determination) or "disagree" (e.g., disagreement with the auditor's determination).

Automated lien resolution platform 300 may obtain the numerous claim/injury pairs and the metadata (e.g., one or more indicia) to construct a historical data structure, which can be stored to the training data store 318. FIG. 4 illustrates an example of historical data structure 400, in accordance with an example. Data structure 400 is illustratively depicted in a tabular structured format, such as Excel or other tabular format, but other structured formats may be used as known in the art. For example, the data structure 400 may be provided as a graph data structure. Automated lien resolution platform 300 may construct the historical data structure 400 from historical lien resolutions and store the historical data structure 400 in the labeled data store 318 as a training data set.

In the example of FIG. 4, historical data structure 500 comprises an injury column 402, a coded ID column 404, and one or more label columns, illustratively depicted as label columns 406A and 406B. Each data cell (or data field) of the data structure 400 can be populated with a data object (or element) that defines information according to respective column. For example, data objects in column 402 specify injury data and data objects in column 404 specify a coded ID of a claim, such as medical diagnosis, procedures, or the like. The historical data structure 400 comprises numerous instances historical data object pairs 410, some of which may be duplicative of others (e.g., a "Mesothelioma"/"Code A" pair is shown four times in this example). Each row represents an instance of a historical data object pair corresponding to an instance of a claim/injury pair from historical lien resolution determinations. As such, the indicators columns specify metadata as indicators that label each claim/injury pair. The indicators may be representative of whether an instance of a coded ID in column 404 was determined to be related to a respective instance of injury in column 402.

The coded IDs may be provided as any standardized statistical codes that transforms diagnosis, procedural, drugs, or other medical descriptions into a standardized code. Examples of standardized statistical codes include, but are not limited to, diagnostic codes (e.g., International Classification of Diseases (ICD) codes, International Classification of Functioning, Disability and Health (ICF) codes, International Classification of Health Interventions (ICHI), Diagnostic and Statistical Manual of Mental Disorders (DSM) codes, and so on), procedural codes (e.g., ICHI codes, International Classification of Primary Care (ICPC) codes, ICD codes, and so on), drug codes (e.g., RxNorm codes, Anatomical Therapeutic Chemical Classification System codes, National Pharmaceutical Product Index, and so on), and medical device codes (e.g., Global Medical Device Nomenclature (GMDN)), among others.

FIG. 4 depicts a significantly simplified example of historical data structure 400 for ease of illustration. Real-world examples may include hundreds of thousands of additional rows for additional data object pairs.

Returning to FIG. 3, during the training phase 320, ML training engine 322 may retrieve the training data set from the training data store 318 and apply the training data set to an ML algorithm 324. In examples, the ML algorithm 324 generates ML model 328 by training on historical data object pairs. For example, with reference to FIG. 4, the ML model 328 may be trained to classify relationships between injury data and lien data by building a weighted mapping from the historical data object pairs 410. The ML training engine 322 may apply historical data object pairs 410 and corresponding metadata to the ML algorithm 324, which identifies unique instances of historical data object pairs 410 (e.g., unique pairs) and determines weights for each unique pair based on the metadata. The weights may represent a measure of a relationship between data objects of a respective unique pair (e.g., a probability of that a coded ID is related to an injury).

In examples, the ML training engine 322 may map injuries, as first data objects, to coded IDs, as second data objects. For example, the ML algorithm 324 may process the historical data structure 400 to identify and extract unique instances of data object pairs from amongst the various historical data object pairs 410. For example, in the case of historical data structure 400, the ML algorithm 324 may identify unique instances of first data objects as: "mesothelioma"; "brain tumor"; and "blood cancer-advanced systemic mastocytosis with associated hematologic neoplasm; mast cell malignancy". Likewise, the ML algorithm 324 may identify unique instances of second data objects as: "code A"; "code B"; "code C"; and "code D". The ML algorithm 324 can be executed to map unique instance of first data objects to unique instance of the second data objects by creating links between each unique instance of first data objects to each unique instances of second data objects, thereby generating unique pairs.

In examples, the ML algorithm 324 can be executed to learn weights from the metadata of the training data set and encode the links with the learned weights. For example, with reference to FIG. 4 as an example, the historical data structure 400 may include multiple instances of historical data object pairs 410. Each instance can be associated with metadata comprising one or more indicia. That is, for example, each instance of historical data object pairs 410 may be labeled with one or more indicia, specified in specified in columns 406A and 406B, that the data objects of a respective pair are related. For a give unique pair, the ML algorithm 324 can search the historical data structure 400, locate each instance of historical data object pairs corresponding thereto, and determine a weight based on the one or more indicia associated with the located instances. The weight can be encoded onto the link associated with the given unique pair.

In an example, the ML algorithm 324 may be configured to determine the weights by tracking and aggregating the one or more indicia associated with the multiple instances of a given unique pair. For example, the one or more indicia may comprise a plurality of indicators used to tag the multiple instances and the ML algorithm 324 may track these indicators across multiple instances. The ML algorithm 324 may then determine a frequency of occurrence for each indicator (e.g., how frequently an indicator occurs within the multiple instances for a given unique pair). The weight can be determined through computing sub-weights, which can be computed by multiplying each determined frequency with respective multipliers and summing the sub-weights.

In an illustrative example, the plurality of indictors can be grouped into two types: auditor indicators and lien holder indictors. Auditor indicators may be include one of a first indicator indicative that a pair of the historical data objects are related (e.g., approved by the auditors 315) or a second indicator indicative that a pair of the historical data objects are unrelated (e.g., denied by the auditors 315). Referring to the example of FIG. 4, column 406A illustrates example auditor indicators provided as "related/approved" and "unrelated/rejected". In some examples, auditor indicators may be provided as "related", "approved", "unrelated", "rejected", or other indicators that represent a relation between historical data objects. In some examples, a binary indicator may be used, for example, where logic "1" may indicate the historical data objects are related and logic "0" may indicate unrelated or vice versa.

Continuing with the above example, lien holder indicators may be include one of a third indicator indicative that a lien holder agreed (e.g., confirmed) with the auditor indicator (e.g., agreement with the auditor indicator) or a fourth indicator indicative that a lien holder disagreed with the auditor indicator (e.g., disagreement with the auditor indicator). Referring to the example of FIG. 4, column 406B illustrates example lien holder indicators provided as "agreed" or "disagreed", however, other indicators that represent a relation between historical data objects. In some examples, a binary indicator may be used, for example, where logic "1" may indicate the agreement and logic "0" may indicate disagreement or vice versa.

The ML algorithm 324 may track the number of occurrences of the auditor and lien holder indicators. For example, the ML algorithm 324 may determine a first frequency ($F_1$) by counting the number of times (e.g., occurrences) that instances of a given unique pair were labeled with a first indicator (e.g., related/approved), and determine a second frequency ($F_2$) by counting the number of times that instances of the given unique pair were labeled with a second indicator (e.g., unrelated/rejected). The ML algorithm 324 may also determine a third frequency ($F_3$) by counting the number of times that the instances of the given unique pair were labeled with a first indicator (e.g., related/approved) and labeled with a third indicator (e.g., agreed); determine a fourth frequency ($F_4$) by counting the number of times that the instances of the given unique pair were labeled with a second indicator (e.g., unrelated/rejected) and labeled with a third indicator (e.g., agreement); and determine a fifth frequency ($F_5$) by counting the number of times that the instances of the given unique pair were labeled with a first indicator (e.g., unrelated/rejected) and labeled with a fourth indicator (e.g., disagreement).

The ML algorithm 324 may compute the weight by applying multipliers to each of the determined frequencies to compute sub-weights and summing the sub-weights. Equation 1 below provides an example computation:

$$W_i = m_1F_1 + m_2F_2 + m_3F_3 + m_4F_4 + m_5F_5 \quad \text{Eq. 1}$$

where $W_i$ represents a weight for an $i^{th}$ unique pair; $m_1$, $m_2$, $m_3$, $m_4$, and $m_5$ represent respective multipliers; and $m_1F_1$, $m_2F_2$, $m_3F_3$, $m_4F_4$, and $m_5F_5$ represent respective sub-weights. In some examples, the second multiplier ($m_2$) may be negative of the first multiplier ($m_1$). The magnitude (e.g., absolute value) the second multiplier ($m_2$) may be equal to the magnitude of the first multiplier ($m_1$). The fourth multiplier ($m_4$) and fifth multipliers ($m_5$), in some example, may be negatives of the third multiplier ($m_3$), and the magnitudes of the third, fourth and fifth multipliers ($m_3$, $m_4$, $m_5$) may be greater than the first multiplier ($m_1$). In some examples, the magnitudes of the third, fourth and fifth multipliers ($m_3$, $m_4$, $m_5$) may be the same. In some example, the magnitude of the third multiplier ($m_3$) may be double the magnitude of the first multiplier ($m_1$).

In some examples, the weights can be normalized. For example the weights associated with each unique pair can be normalized such that the maximum value across all weights is normalized to 1 or some other common maximum value. In this way, the weights may be comparable.

The ML training engine 322 may initialize the weights using random or predefined values, which can be adjusted during training. In some examples, a training GUI 326 may be provided to allow operators to input training parameters, such as parameters for initializing the weights and multiplier values.

Figure 5:
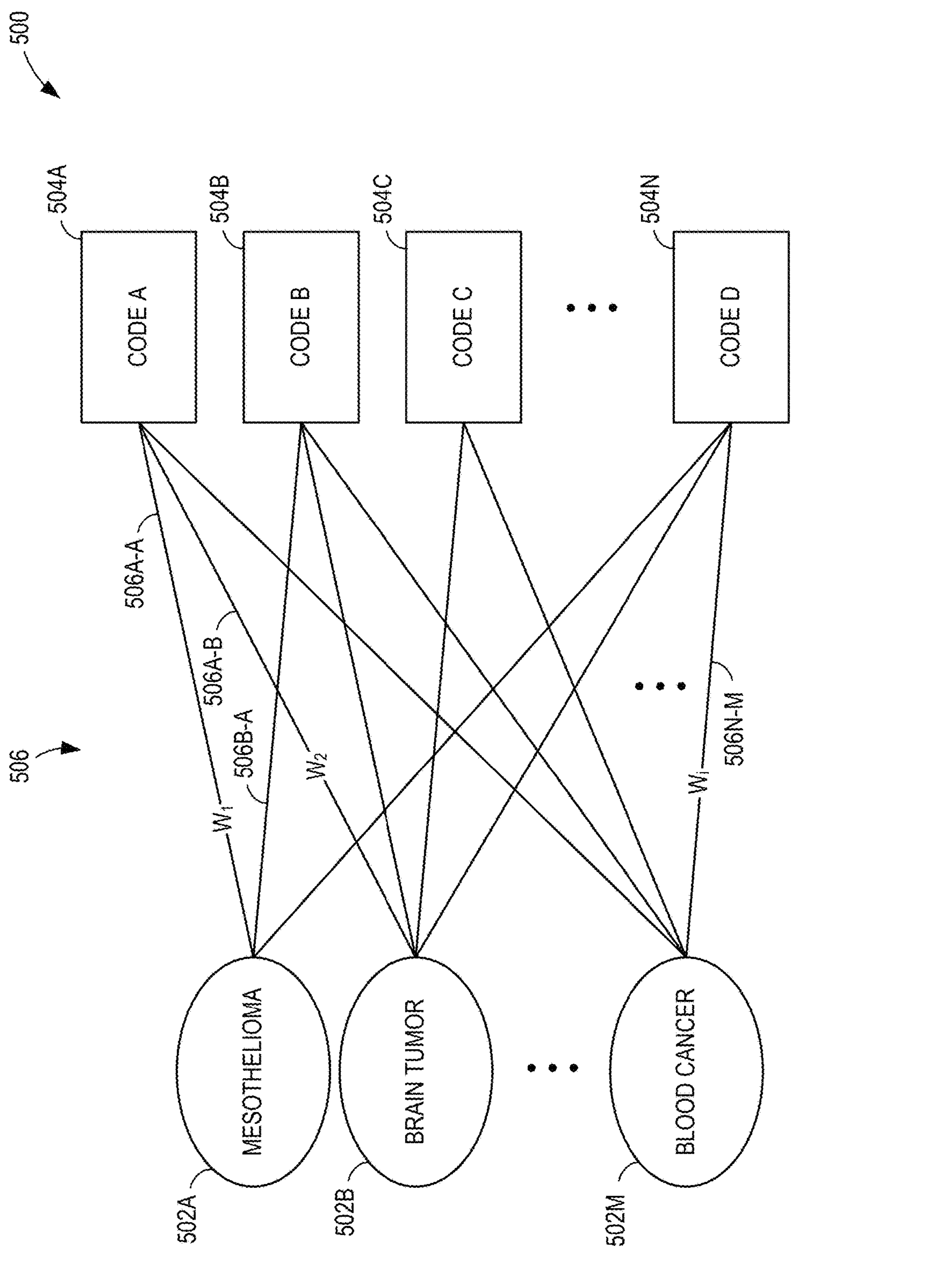
FIG. 5 illustrates an example of a weighted mapping built from the example training data of FIG. 4, in accordance with this example.

FIG. 5 illustrates an example of a weighted mapping 500 built from the example historical data structure, in accordance with this example. For example, the weighted mapping 500 comprises first data objects 502A-502M and second data objects 504A-502N extracted from a historical data structure and mapped together via links 506A-A through 506N-M. Links 506A-A through 506N-M may be encoded with weights $W_1$-$W_i$ derived from the historical data structure.

In the example of FIG. 5, the weighted mapping 500 is built from historical data structure 400. In this case, the weighted mapping 500 comprises a plurality of unique instance of coded IDs as second data objects 504A-504N, for example, code A as data object 504A, code B as data object 504B, code C as data object 504C, and code D as data object 504N. The weighted mapping 500 also comprises a plurality of unique instance of injuries as first data objects 502A-502M, for example, "mesothelioma" as data object 502A; "brain tumor" as data object 502B; "blood cancer-advanced systemic mastocytosis with associated hematologic neoplasm; mast cell malignancy" as data object 502C; and injury N as data object 502M. The number M of first data objects and number N of second data objects may be equal or different. Links 506 can be established between each second data object 504A-504N and each first data object 502A-502N, for example, link 506A-A connects second data object 504A to first data object 502A; link 506A-B connects second data object 504A to first data object 502B; link 506B-A connects second data object 504B to first data object 502A; and so on until link 506N-M connects second data object 504N to first data object 502M.

The weights $W_1$-$W_i$ may be derived from the indicators specified in columns 406A and 406B as described above. For example, link 506A-A can be computed from the four instances of "mesothelioma" and "Code A" in historical data structure 400. In this example, there are 3 occurrences of a first indicator (e.g., related/approved) and 1 occurrence of a second indictor (e.g., unrelated/rejected). There are also 2 occurrences of the first indicator and the third indicator (e.g., agreed); 1 occurrence of the second indicator and the fourth indicator (e.g., disagreed); and 1 occurrence of the first indicator and the fourth indicator. Thus, in this example, $F_1$=3; $F_2$=1; $F_3$=2; $F_4$=0; and $F_5$=1.

In some examples, the weighted mapping 500 may be stored as ML model 328, for example, as a data structure according to a structured format (e.g., JSON, XML, Excel, CSV, or the like). FIG. 5 illustrates the weighted mapping as a weighted graph data structure having vertices (e.g., data objects 502A-502M and 504A-504N) connected by edges (e.g., links 506) that are weighted through the learning.

The weighted mapping may be stored according other formats, for example, as a tabular format. In this case, data cells of the table data structure can be populated with data objects 502A-502N and 504A-504N, where each row (or column) corresponds to a unique pair. The row (or column) may embody the link and another data cell in the row (or column) can be populated with the respective weight. In any case, the ML model 328 may be stored to the model store 325.

The trained ML model 328 may be used during the inference phase 330 when new, incoming unlabeled data is received during a subsequent execution of the data collection phase 310. For example, automated lien resolution platform 300 may receive injury data 302A and lien data 312B from data sources 312 at a time after the ML model 328 is trained and stored to the model store 325. The inference phase 330 may be executed to identify and extract relationships between the injury data 302A and lien data 312B.

In examples, data sources 312 may comprise a first third party system (e.g., third party system 150A) and a second third party system (e.g., third party system 150B). First third party system may generate a data structure comprising injury data 312A related to a settlement. The data structure, comprising injury data 312A, may be provided to automated lien resolution platform 300. Second third party system may generate a data structure related to a lien against the settlement (e.g., one or more lien holders) and provide the data structure, including lien data 312B, to automated lien resolution platform 300. In some examples, the injury data 312A and lien data 312B (as well as corresponding data structures) may be received over API integration with the automated lien resolution platform 300 via a network (e.g. network 140). In another example, the injury data 312A and lien data 312B may be received through other means via a network, such as but not limited to, e-mail. In various examples, the injury data 312A and lien data 312B can be encrypted during transmission, for example, according to TLS protocols to protect personal identifying information (PII) and personal health information (PHI) in accordance with Health Insurance Portability and Accountability Act (HIPPA).

Figure 6:
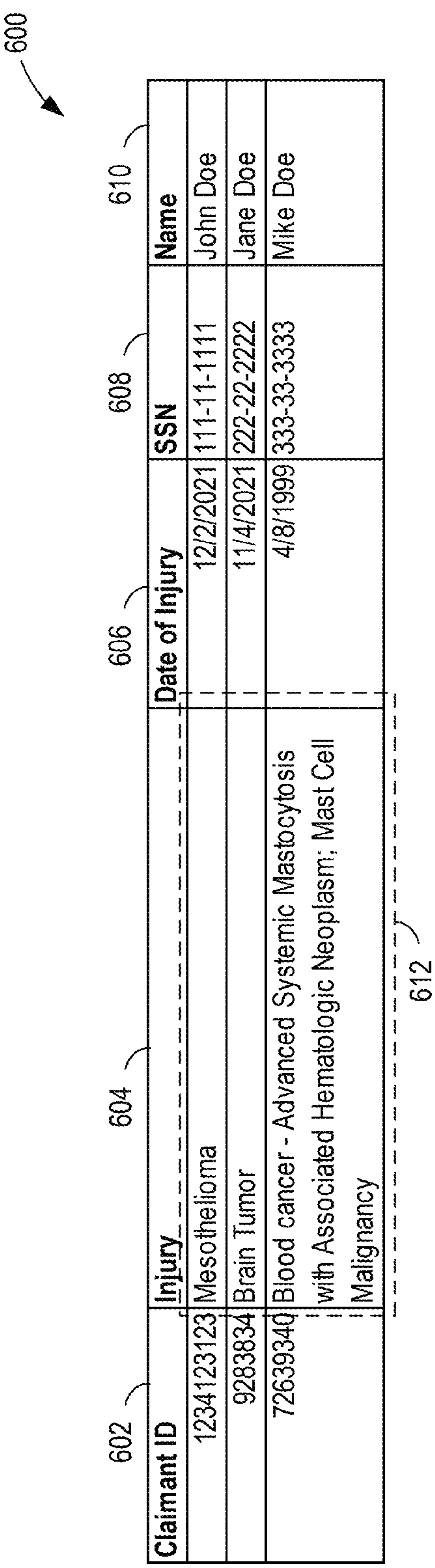
FIG. 6 illustrates an example of input data that can applied to the example architecture of FIG. 3, in accordance with an example.

FIG. 6 illustrates an example of data structure 600 that includes injury data 312A received by the automated lien resolution platform 300, in accordance with an example. FIG. 6 depicts data structure 600 in a tabular structured format, such as Excel or other tabular format, but other structured formats may be used as known in the art. As noted above, the information contained in the data structure 600 may be encrypted upon transmission.

In the example of FIG. 6, data structure 600 comprises a claimant ID column 602, an injury column 604, date of injury column 606, a personal identifier column 608 (e.g., a social security number, medical records number, and the like), and a claimant name column 610. Each row represents a claimant related to the settlement and an injury covered by the settlement for that claimant. Each data cell (or data field) of the data structure 600 is populated with a data object (or element) that defines information according to the column for the claimant identified in column 602. For example, injury data 312A may include an injury data object "Mesothelioma", which was experienced by claimant ID 1234123123. In this example, the data objects 612 populating the injury column 604 may be example an of injury data 312A.

FIG. 6 depicts a simplified example of data structure 600 for ease of illustration. Real-world examples may include numerous additional line-items for additional claimants and/or injuries.

FIG. 7 illustrates an example of data structure 700 that includes lien data 312B received by the automated lien resolution platform 300, in accordance with an example. FIG. 7 depicts data structure 700 in a tabular structured format, such as Excel or other tabular format, but other structured formats may be used as known in the art. As noted above, the information contained in the data structure 700 may be encrypted upon transmission.

In the example of FIG. 7, data structure 700 comprises a patient ID column 702, a treatment date column 704, a coded IDs column 706, a description column 708, and an amount column 710. Each row represents a lien (or claim) for the patient identified in column 702. Each data cell (or data field) of the data structure 700 is populated with a data object (or element) that defines information for a lien. For example, a first claim may include a coded ID "518.89", which is a transformation of the description in column 708 into a standardized statistical code (e.g., clinical coding). In this example, the data objects 712 populating the coded ID column 706 may be an example of lien data 312B. The coded IDs may be provided as any standardized statistical code that transforms diagnosis, procedural, drugs, or other medical descriptions into a code, as described above in connection with FIG. 4.

FIG. 7 depicts a simplified example of data structure 700 for ease of illustration. Real-world examples may include numerous additional line items for additional claimants and/or injuries.

In the examples of FIGS. 6 and 7, automated lien resolution platform 300 may be configured to identify and extract relationships between injuries of (e.g., data objects 612) specified in column 604 and coded IDs (e.g., data objects 712) specified in column 708. While the data structures 600 and 700 provided by the data sources 312 may contain additional information, as shown in FIGS. 6 and 7, the examples herein can be utilized to extract relationships between the injuries and coded IDs, without relying on the additional information that may be provided in the data structures 600 and 700. In other words, the injuries specified in column 604 and coded IDs specified in column 708 may be disparate and not directly comparable in and of themselves.

Returning to FIG. 3, at block 314 the injury data 312A and lien data 312B can be ingested as unlabeled data. As alluded to above, the transmissions including the injury data 312A and lien data 312B may include other information (e.g., as described in connection with FIGS. 6 and 7), which may not correspond to a label added by automated lien resolution platform 300 later in the process. Instead, any labels added by automated lien resolution platform 300 may be representative of relationships between unlabeled injury data 312A and unlabeled lien data 312B. The unlabeled data (e.g., unlabeled injury data 312A and unlabeled lien data 312B) can be stored to unlabeled data store 316 (e.g., an example implementation of data store 122).

In some examples, the ingesting process may be executed, for example, by data processing module 110 of FIG. 1. Thus, ingesting at block 314 may include a data acceptance and validation process to help ensure that incoming data is accurate, reliable, and consistent before stored to a data store. For example, the process may verify that the data adheres to predefined criteria, like data format, data type, and expected size. In another example, the integrity of the data may be analyzed to determine whether the data are altered or corrupted during transmission or storage. This may include checking for checksums, digital signatures, or hashing algorithms to verify data integrity. In other examples, the data are checked against predefined standards or schema to ensure that it aligns with the expected format, structure, and content, including a comparison to specific data models or industry standards.

In some examples, the ingesting process may include filtering and transformation. For example, the ingesting process may perform data cleansing techniques to identify and correct (or remove) corrupt, inaccurate, or irrelevant data. Furthermore, the ingesting process may perform decryption of received data according to known techniques. For example, data received encrypted according to TLS protocols can be decrypted for processing. In some examples, the ingesting process may encrypted the data according to another protocol for storage. For example, the data may be encrypted using AES protocols (e.g., AES-256) to protocol PII and PHI in accordance with HIPPA.

The inference process may implement preprocessing module 332 of the data. For example, after the unlabeled data is ingested, the data may be partitioned and provided for preprocessing. The ingesting/preprocessing may remove subsets of data based on predefined criteria (e.g., corrupted or otherwise unusable data), convert the data to a different data type or protocol/format, or add missing values. In some examples, preprocessing module 332 may include a spell-checking algorithm that can use approximate string matching algorithms, such as Levenshtein distance or the like, to find correct spellings of misspelled words and to locate proper spellings from the unlabeled data. For example, an injury specific in the injury data 312A may be misspelled and preprocessing module 332 can be performed to correct the spelling so to proper correspond to other instances of the same injury.

The inference engine 334 may access the trained ML model 328 stored to the model store 325 and apply the preprocessed, unlabeled injury data 312A and unlabeled lien data 312B thereto as input. The trained ML model 328 processes the input injury and lien data through the weighted mapped to generate output predictions. The interference engine 334 may utilize the ML model 328 to output determined likelihoods that input lien data is related to input injury data. The inference engine 334 may use the likelihoods (e.g., probabilities) to make predictions and generate labels indicative of the determined predictions, which can be assigned to input lien data, for example, by tagging the input lien data. Input lien data, tagged with the labels based on predictions can be stored to the inference results data store 336.

In an example, the likelihood that that input lien data is related to input injury data may be determined by computing a score using the weighted mapping. For example, the inference engine 334 may determine or otherwise associate each input lien data object (e.g., each coded ID specified in column 706 of FIG. 7) to an input injury data object (e.g., an injury specified in column 604 of FIG. 6) to provide mapped input pairs. The inference engine 334 may process the mapped input pairs through weighted mapping. The inference engine 334 can locate a unique pair in the weighted mapping that corresponds to (e.g., similar to or otherwise matching) the mapped input pair. The inference engine 334 may extract a weight encoded to the link associated with the located unique pair and determine the score for the mapped input pair from the extracted weight. The score may represent a measure of the relationship between the input lien data object and the input injury data object of the mapped input pair. The inference process can be performed for each mapped input pair to provide scores on a per-mapped input pair basis.

The inference engine 334 may apply one or more thresholds to the score for thresholding predictions. For example, for a given mapped input pair, the inference engine 334 may compare the determined score to one or more score threshold(s) and output a determined prediction based on satisfying the one or more score thresholds. For example, if the score is equal to or greater than a first score threshold, then the inference engine 334 may predict that the lien data object is related to the injury data object. However, if the score is equal to or less than a second score threshold, then the inference engine 334 may predict that the lien data object is unrelated to the injury data object. If the score lies between the first and second score thresholds, the inference engine 334 may not be able to predict and relationship (e.g., unable to make a confident prediction) because the probability does not sufficiently point to either determination.

In some examples, the first score threshold may be a positive value (e.g., 80% or 0.8), while the second score threshold may be a negative value (e.g., −80% or −0.8). For example, Eq. 1 above can provide positive and negative weights depending on the tracked metadata. Positive weights suggest a relation between input data objects, while negative weights suggest divergence or no relations therebetween. Score thresholds can be set to positive and negative values so to identify those data objects that are probabilistically related (e.g., exceed or equal to the first score threshold) and those that are probabilistically unrelated (e.g., lower than or equal to the second score threshold). Weights lying between the score thresholds as upper and lower bounds may suggest a measure of the relationship, but may not do so with sufficient confidence to be relied upon. The thresholds can be adjusted over time, for example, by decreasing the magnitude (e.g., absolute value) of one or more score threshold(s) as accuracy and confidence in the training increases with larger training data sets and/or retraining.

As an illustrative example, referring to FIGS. 5-7, the inference engine 334 may map lien data object "518.89" to injury data object "mesothelioma" to generate a mapped input pair. The inference engine 334 can locate a unique pair in the weighted mapping (e.g., weighted mapping 500) that corresponds to the mapped input pair. For example, assume Code A in the weighted mapping 500 is "518.89." In this case, the inference engine 334 may locate the unique pair:

"mesothelioma" and "code A." The inference engine 334 may extract weight $W_1$ encoded to the link 506A-A associated with the unique pair and determine the score for the mapped input pair as the weight $W_1$. The score may represent a probability that the lien data object "518.89" is related to the injury data object "mesothelioma". If the score exceeds a first score threshold, then the lien data object "518.89" may be assigned a label indicating it is related to the injury data object "mesothelioma".

The inference engine 334 may update the input lien data (as well as the data structure 700) received as unlabeled lien data 312B based on predictions. In some examples, inference engine 334 may add labels of determined predictions to lien data objects. In another example, the inference engine 334 may execute deletion operations that automatically removes lien data objects predicted to be unrelated to the injury data object. The updated input lien data, as well as encompassing data structure, can be stored to inference results data store 336.

Update engine 329 may access the inference results data store 336 and retrieve any lien data objects that could not be probabilistically predicted as related to the injury data object (e.g., those having scores that lie between the first and second score thresholds). Update engine 329 may execute algorithms to review outputs from the inference engine 334 and, in some examples, validate or update the results. In some examples, the update engine 329 may initiate a label validation process. During the label validation process, update engine 329 may be executed to revise labels associated with particular data object or add data labels thereto. For example, for lien data objects having a score that did not satisfy the one or more score thresholds, the lien data object and injury data object may be provided for further review.

In some examples, label validation or updates may be added to lien data objects by a human user. For example, upon determining that a lien data object could not be probabilistically determined to be related or unrelated to an injury data object, the update engine 329 may prompt or trigger a user interface of auditor(s) 315 for feedback on the mapped input pair for which the prediction was not possible. The auditor(s) 315 may enter a label, for example, by examining a description associated with the lien data object in view of the injury data object. The label added by the auditor(s) 315 may be used to update the inference results stored to inference results data store 336. The label and mapped input pair may also be used to update the training data set, for example, as a new historical data object pair, which can be used to retrain the ML model 328 and update the weights during a subsequent iteration of the training phase 320. Thus, the ML model 328 can be continuously updated and refined through reinforcement learning techniques.

In examples, update engine 329 may access the inference results data store 336 and retrieve inference results, which can be added to the training data set and used to retraining of the ML model 328 during a subsequent iteration of the training phase 320. For example, mapped input pairs and labels assigned to lien data objects of the mapped input pairs may be added to the historical data structure as historical data object pairs tagged with the label and stored to training data store 318. The update engine 329 may update the training data set with new historical data object pairs, which can be used for subsequent training.

In some examples, inference engine 334 may also execute operator-defined rules that can be used to override predictions made through application of the trained ML model 328. For example, operator-defined rules may specify conditions that negate a score or otherwise indicate that a lien data object is unrelated regardless of the score. For example, operator-defined rules may define timing conditions that, if not satisfied, indicate that the lien data object is unrelated to the injury data object. As an illustrative example, referring to FIGS. 6 and 7, the injury data object "mesothelioma" may be associated with a date of injury in column 606 of "Dec. 2, 2021", while the lien data object "518.89" may be associated with a treatment date of "Oct. 24, 2011." An operator-defined rule may specify that any lien data object associated with a treatment date occurring before the date of injury is unrelated to the injury data. In this case, the lien data may be labeled as unrelated/reject, regardless of the score. As another example, the data structure containing the injury data objects may specify a settlement date and an operator-defined rule may specify that any lien data object associated with a treatment date occurring after the settlement date is unrelated.

The inference phase 330 may generate a lien resolution report from the updated lien information, which can be used for third party validation module 340 and resolving the lien. For example, a lien resolution report can be provided to a third party system that sourced the lien data 312B (e.g., a lien holder) for validation of the update lien data. The third party system may review the predictions and add labels of its own, such as "agreed" or "disagreed" labels to each lien data object. The added labels can be accessed by the update engine 329 and used to update the training data set at the training data store 318 for updating and refining the ML model 328 in a subsequent iteration of training phase 320.

Once the third party system agrees with the lien resolution report, the third party may notify the automated lien resolution platform 300, which can use the lien resolution report to update the total lien amount at lien resolution module 342. For example, lien data objects determined to be unrelated to the injury data objects can be deleted or otherwise filtered from the data structure comprising the lien data. The total amount of the lien, specified in the data structure comprising the lien data 312B, can be reduced based on the deleted or otherwise filtered items. For example, lien amounts (column 710 of FIG. 7) of the unrelated lien data objects can be subtracted from the total lien amount.

FIG. 8 illustrates an example lien resolution report that can be generated by automated lien resolution platform 300, in accordance with an example disclosed herein. FIG. 8 depicts lien resolution report 800 in a tabular structured format, such as Excel or other tabular format, but other structured formats may be used as known in the art. As noted above, the information contained in the lien resolution report 800 may be encrypted upon transmission.

In the example of FIG. 8, lien resolution report 800 comprises a patient ID column 802, a treatment date column 804, one or more coded IDs column 806A-806D, a lien holder response column 808, a predicted categorization column 810, and an explanation column 812. Each row represents a lien, which may include one or more coded IDs related to a claim (e.g., diagnosis, procedures, etc.). The predicted categorization column 810 may be populated with labels generated and assigned by the automated lien resolution platform 300 based on applying the ML model 328 to the coded IDs specified in columns 806A-806D and an injury data object. The predicted categorization column 810 may represent the extracted relationships. In FIG. 8, the predicted categorization column 810 includes additional labels "[Sys]" and "[Auditor]", which indicate whether the automated lien resolution platform 300 generated the label or if an auditor 315 added the label. Lien holder response column 808 includes validations by the third party system at third party validation 340. Column 808 and labels added by auditor 315 in column 810 may be used by the update engine 329. System explanation column 812 can be populated with a description of why a particular lien data object was rejected or approved, for example, based on an operator-defined rule.

Inference engine 334 may generate the lien resolution report 800 absent entries in column 808. This lien resolution report 800 may be stored to inference results data store 336. Column 808 may be populated subsequently.

FIG. 8 depicts a simplified example of lien resolution report 800 for ease of illustration. Real-world examples may include numerous additional line items for additional claimants and/or injuries.

While certain examples include communicating a lien resolution report to third party systems for validation, examples herein utilize the ML model 328 to reduce the iterations of negotiations between auditors 315 and third party systems (e.g., lien holders) in resolving the lien. While some back and forth is shown, other examples may involve minimal back and forth or simply a full agreement as the ML model 328 is refined through training. Thus, examples herein may provide for a single transmission of a lien resolution report, which the third party system may assent to without changes, thereby significantly reducing the communications between parties and decreasing time needed to resolve the lien.

Figure 9:
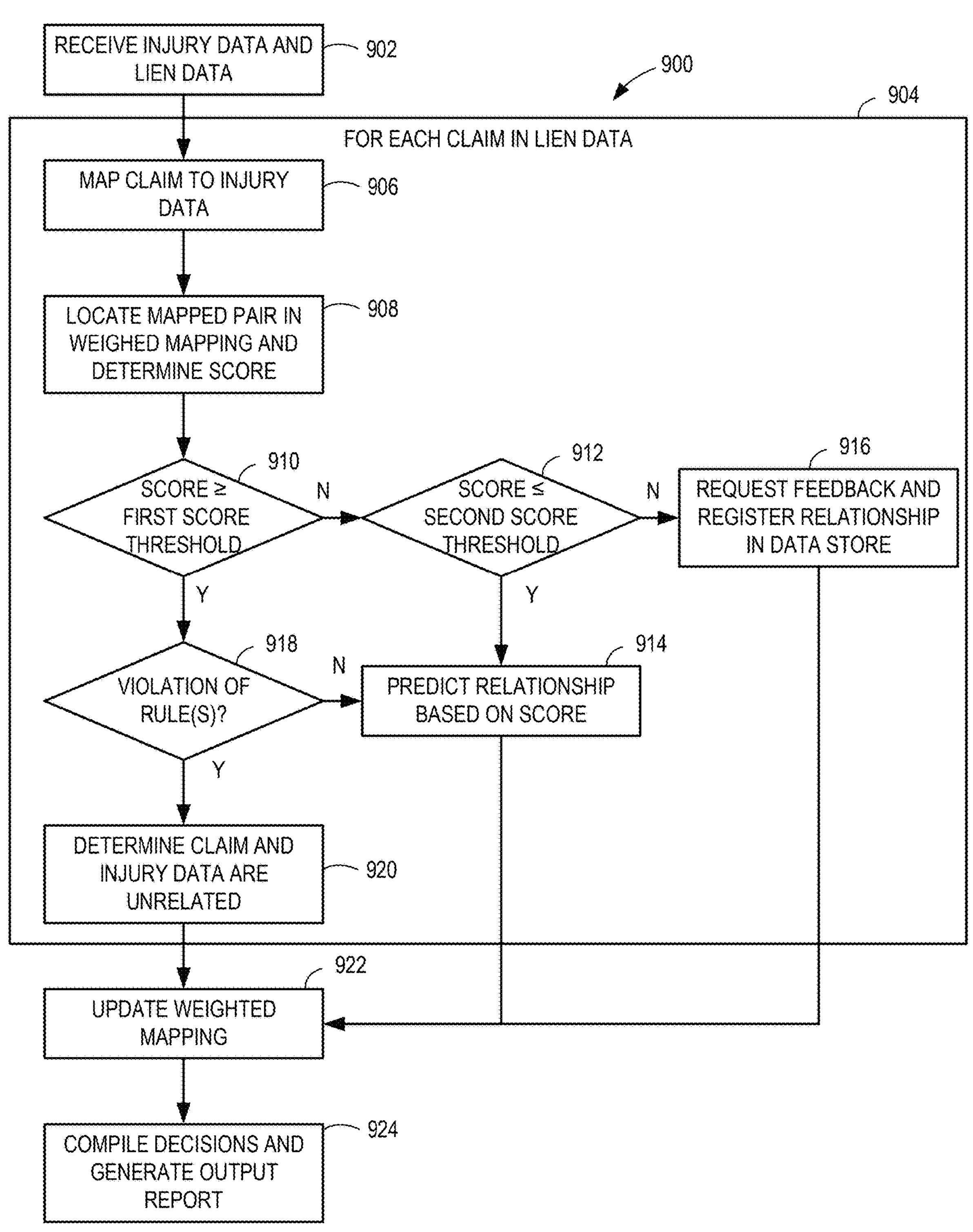
FIG. 9 illustrates an example flow chart of a process, in accordance with various examples of the disclosed technology

FIG. 9 depicts an example flow chart of a process 900 for automated lien resolution, in accordance some examples of the disclosed technology. Method 900 may be executed, for example, by a computing component, such as a server computer, a controller, or any other similar computing component capable of processing data. In the example implementation, the method 900 may be stored as instructions in machine-readable storage medium that can be executed by a hardware processor, for example, the method 900 may be stored as instructions in machine-readable storage 108 and executed by processor(s) 104.

At block 902, injury data and lien data can be received. For example, a first input data structure may be received from a first third party system and a second input data structure may be received from a second third party system. The first input data structure (e.g., data structure 600) may include unlabeled injury data (e.g., injury data 312A of FIG. 3) that specify one or more injuries. The second input data structure (e.g., data structure 700) may include unlabeled lien data (e.g., lien data 312B of FIG. 3) that specify a plurality of claims.

Process 900 executes a sub-process 904 for each claim specified in the lien data. For example, process 900 may apply the injury and lien data received at block 902 to a trained ML model (e.g., ML model 328 of FIG. 3) to determine probabilistic relationships between the injury data and the lien data. At block 906, a claim can be mapped to the injury data, providing a mapped input pair. The mapped input pair can be applied to the ML model, which may include a weighted mapping (e.g., weighted mapping 500 described above in connection with FIGS. 3 and 5). For example, the mapped input pair can be through the weighted mapping so to locate an instance of the mapped pair in the weighted mapping and determine a score (block 908). For example, block 906 may extract a weight encoded to a link associated with the located instance (e.g., a unique pair in the weighted mapping as described above) and determine the score for the mapped input pair from the extracted weight.

Process 900 may apply score thresholds to the determined score for determining a relationship for the mapped input pair. For example, the determined score can be compared to a first score threshold (block 910). If the determined score is less than the first score threshold, the determined score can be compared to a second score threshold (block 912). If the score is equal to or less than the second score threshold, sub-process 904 may predict a relationship based on the score (block 914). For example, block 914 may predict that the claim is unrelated to the injury data. Block 914 may include generating a label indicative of the prediction and updating the claim with label (e.g., tagging the claim with the generated label), which can be stored to a data store (e.g., inference results data store 336). However, if the determination at block 912 is that the score is greater than the second threshold, sub-process proceeds to block 916 to request feedback the score does not sufficiently point a predictable relationship.

In examples, block 914 may request feedback from a human user (e.g., an auditor). For example, upon a negative determination at block 912, block 914 may prompt or trigger a user interface for feedback on the mapped input pair. The auditor may enter a label, for example, by examining a description associated with the claim in view of the injury data. The label may be assigned to the claim and stored to a data store (e.g., inference results data store 336).

If, at block 910, the score is determined to be equal to or greater than the first score threshold, then sub-process 904 may proceed to block 918 to determine if the mapped input pair violates any operator-defined rules, for example, as described above in connection with FIG. 3. If an operator-defined rule is not violated, the sub-process 904 proceeds to block 914 and predicts a relationship based on the score (block 914). For example, block 914 may predict that the claim is related to the injury data. Block 914 may include generating a label indicative of the prediction and updating the claim with label (e.g., tagging the claim with the generated label), which can be stored to a data store (e.g., inference results data store 336).

If an operator-defined rule is violated at block 918, block 920 may determine that the claim is unrelated to the injury data due to the violation. In this case, block 920 may generate a label indicative that the claim is unrelated, regardless of the score. The claim can be assigned the label and stored to a data store (e.g., inference results data store 336).

At block 922, the weighted mapping can be updated based on the predictions from blocks 914, 916, and 920. For example, the labels generated at blocks 914, 916, and 920 can be assigned to the mapped input pairs and used to update training data used to train the ML model (e.g., update the weights of the weighted mapping) by retraining the ML model, for example, as described above in connection with FIGS. 1 and 3.

At block 924, a lien resolution report can be generated from the labeled claims. For example, lien data can be updated to include labels assigned to each claim. As described in connection with FIG. 3, the lien resolution report (e.g., lien resolution report 800) may be provided to a third party system that sourced the lien data for validation. Alternative, and in addition to, a total amount of a lien may be reduced based on the lien resolution report, for example, by removing amounts associated with claims determined to be unrelated.

Figure 10:
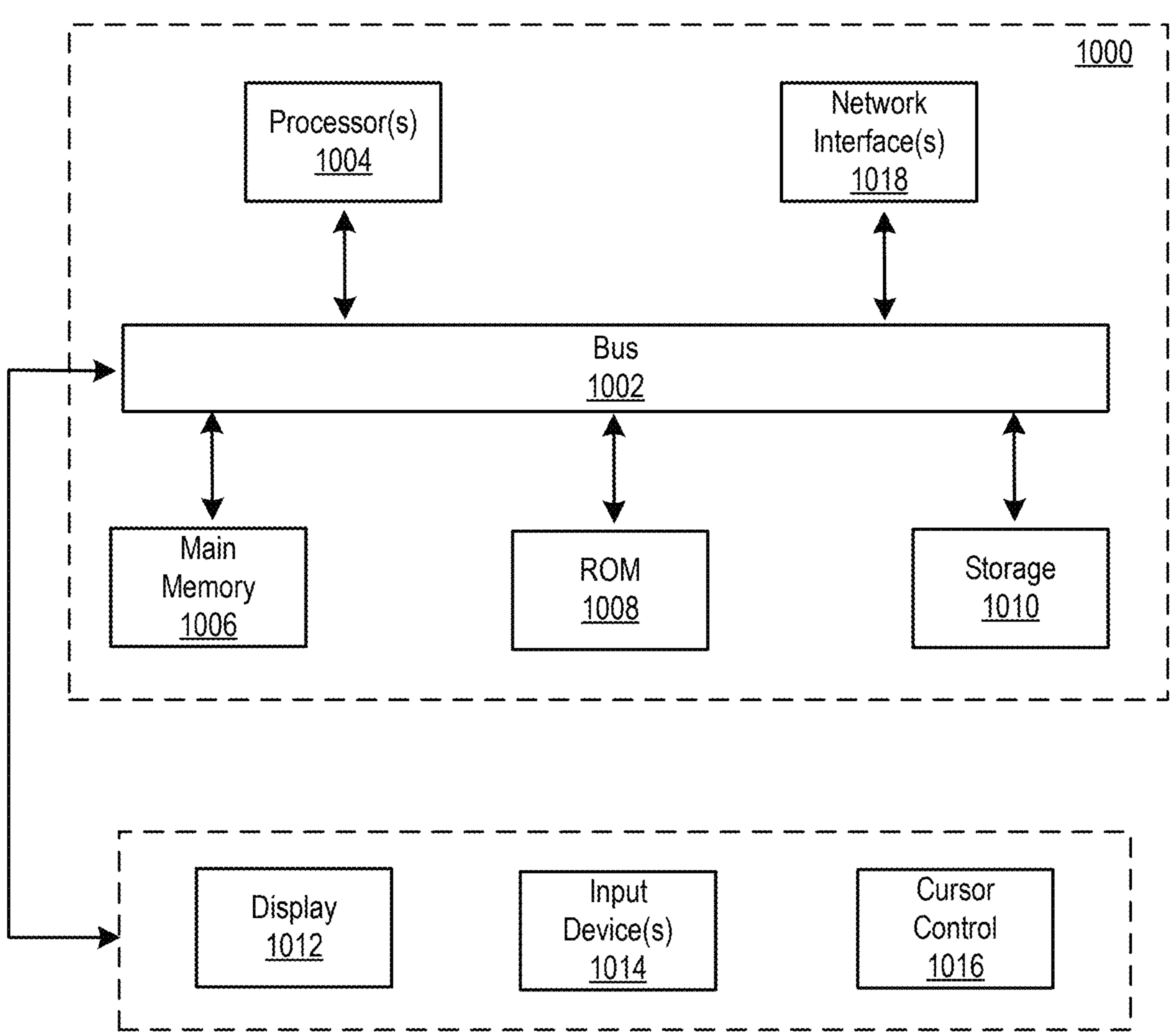
FIG. 10 is a computing component that may be used to implement examples of the disclosed technology.

FIG. 10 depicts a block diagram of an example computer system 1000 in which various examples of the disclosed technology described herein may be implemented. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors. The computer system 1000 may be implemented as one or more component of FIGS. 1 and 3.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions. For example, main memory 1006 may store instructions, that when executed by processor(s) 1004, cause computer system 1000 to perform one or more of the operations described in connection with FIGS. 2, 3, and 9.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a liquid crystal display (LCD) (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. In some examples, the same direction information and command selections as cursor control may be implemented via receiving touches on a touch screen without a cursor.

The computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1000 may implement the techniques described herein using customized hard-wired logic, one or more ASICs or FPGAS, firmware and/or program logic which in combination with the computer system causes or programs computer system 1000 to be a special-purpose machine. According to one example of the disclosed technology, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

The computer system 1000 also includes a network interface 1018 (also referred to as a communication interface) coupled to bus 1002. Network interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, network interface 1018 may be a local area network (LAN) card to provide a data communication connection to a compatible LAN (or WAN component to communicated with a WAN). Wireless links may also be implemented. In any such implementation, network interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through network interface 1018, which carry the digital data to and from computer system 1000, are example forms of transmission media.

The computer system 1000 can send messages and receive data, including program code, through the network(s), network link and network interface 1018. In the Internet example, a server might transmit a requested code for an application program through the Internet, the ISP, the local network and the network interface 1018.

The received code may be executed by processor 1004 as it is received, and/or stored in storage device 1010, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALS, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1000.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:

obtaining a historical data structure, the historical data structure comprising historical data object pairs labeled with metadata, wherein the historical data object pairs comprise first data objects associated with second data objects that are disparate to the first data objects;

mapping a plurality of the first data objects to a plurality of the second data objects by linking each of the plurality of the first data objects to each of the plurality of the second data objects to generate data object pairs;

encoding the links with weights determined by, for each data object pair:

locating, in the historical data structure, a plurality of instances of the historical data object pairs corresponding to the data object pair; and determining a weight for the link associated with the historical data object pair based on tracking the metadata associated with each of the plurality of instances of the historical data object pairs, wherein the weight is increased based on the metadata associated with instances of the plurality of instances of the historical data object pairs comprising a first indicator representative that first data objects and second data objects of the instances are related, and wherein the weight is reduced based on the metadata associated with the instance comprising a second indicator representative that the first data object and the second data object of the instance are not related;

building a weighted mapping comprising the data object pairs and associated weighted links;

receiving a first input data object from a first source and an input data structure from a second source, the input data structure comprising a plurality of second input data objects;

determining probabilistic relationships between each of the plurality of second input data objects and the first input data object by processing the first input data object and the plurality of second input data objects through the weighted mapping;

updating the input data structure based on the probabilistic relationships by generating labels for each of the plurality of second input data objects representative of the probabilistic relationships and tagging the plurality of second input data objects with the generated labels; and transmitting the updated input data structure to the second source.

2. The method of claim 1, wherein mapping the plurality of the first data objects to the plurality of the second data objects comprises:

identifying first unique instances of the first data objects and extracting the first unique instances as the plurality of the first data objects;

identifying second unique instances of the second data objects and extracting the second unique instances as the plurality of the second data objects; and mapping each of the first unique instances to each of the second unique instances as the data object pairs.

3. The method of claim 2, wherein building the weighted mapping comprises:

creating a data structure;

populating the data structure with the first unique instances of the first data objects and the second unique instances of the second data objects; and connecting each of the first unique instances to each of the second unique instances using the weighted links.

4. The method of claim 1, wherein the metadata comprises one or more indicia of a relationship between a first data object and a second data object of a historical data object pair.

5. The method of claim 4, wherein the one or more indicia comprises one or more of:

the first indicator representative that a first data object and a second data object of a historical data object pair are related;

the second indicator representative that a first data object and a second data object of a historical data object pair are not related;

a third indicator representative of agreement with one of the first or second indicators; or a fourth indicator representative of disagreement with one of the first or second indicators.

6. The method of claim 5, wherein determining the weight for the link associated with the data object pair comprises:

tracking the one or more indicia associated with each of the plurality of instances of the historical data object pairs; and aggregating the tracked one or more indicia to compute a weight.

7. The method of claim 6, wherein tracking the one or more indicia comprises determining frequencies that the first, second, third, and fourth indicators occur across the plurality of instances of the historical data object pairs, and wherein determining the weight for the link comprises computing the weight based on the determined frequencies.

8. The method of claim 7, wherein computing the weight comprises:

computing a first sub-weight by multiplying a frequency that the first indicator occurs by a first multiplier;

computing a second sub-weight by multiplying a frequency that the second indicator occurs by a second multiplier;

computing a third sub-weight by multiplying a frequency that the first indicator and the third indicator occurs by a third multiplier;

computing a fourth sub-weight by multiplying a frequency that the second indicator and the third indicator occurs by a fourth multiplier; and computing a fifth sub-weight by multiplying a frequency that the first indicator and the fourth indicator occurs by a fifth multiplier; and wherein the weight is computed as a sum of the first, second, third, fourth, and fifth sub-weights.

9. The method of claim 8, wherein the second multiplier is a negative of the first multiplier, wherein the fourth and fifth multipliers are negatives of the third multiplier, and wherein magnitudes of the third, fourth and fifth multipliers are greater than the first multiplier.

10. The method of claim 1, wherein determining probabilistic relationships between a plurality of second input data objects and a first input data object comprises, for each second input data object:

locating, in the weighted mapping, a data object pair corresponding to a respective second input data object and the first input data object;

identifying a link associated with the located data object pair; and computing a score from a weight encoded onto the identified link, wherein the probabilistic relationship for the respective second input data object is based on the computed score.

11. The method of claim 10, wherein determining probabilistic relationships between a plurality of second input data objects and a first input data object further comprises:

responsive to a determination that the computed score is equal to or greater than a first threshold, determining that the respective second input data object is related to the first input data object;

responsive to a determination that the computed score is equal to or less than a second threshold, determining that the respective second input data object is not related to the first input data object; and responsive to a determination that the computed score is between the first and second thresholds, triggering a user interface to prompt a user to input a relationship between the respective second input data object is not related to the first input data object.

12. The method of claim 1, further comprising:

updating the weights encoded to the links based on the generated labels.

13. A system, comprising:

a memory storing instructions; and a processor communicably connected to the memory and configured to execute the instructions to:

obtain a historical data structure, the historical data structure comprising historical data object pairs labeled with metadata, wherein the historical data object pairs comprise first data objects associated with second data objects that are disparate to the first data objects;

map a plurality of the first data objects to a plurality of the second data objects by linking each of the plurality of the first data objects to each of the plurality of the second data objects to generate data object pairs;

encode the links with weights determined by, for each data object pair:

locating, in the historical data structure, a plurality of instances of the historical data object pairs corresponding to the data object pair; and determining a weight for the link associated with the historical data object pair based on tracking the metadata associated with each of the plurality of instances of the historical data object pairs, wherein the weight is increased based on the metadata associated with instances of the plurality of instances of the historical data object pairs comprising a first indicator representative that first data objects and second data objects of the instances are related, and wherein the weight is reduced based on the metadata associated with the instance comprising a second indicator representative that the first data object and the second data object of the instance are not related;

build a weighted mapping comprising the data object pairs and associated weighted links;

receiving a first input data object from a first source and an input data structure from a second source, the input data structure comprising a plurality of second input data objects;

determine probabilistic relationships between each of the plurality of second input data objects and the first input data object by processing the first input data object and the plurality of second input data objects through the weighted mapping;

update the input data structure based on the probabilistic relationships by generating labels for each of the plurality of second input data objects representative of the probabilistic relationships and tagging the plurality of second input data objects with the generated labels; and transmitting the updated input data structure to the second source.

14. The system of claim 13, wherein mapping the plurality of the first data objects to the plurality of the second data objects comprises:

identifying first unique instances of the first data objects and extracting the first unique instances as the plurality of the first data objects;

identifying second unique instances of the second data objects and extracting the second unique instances as the plurality of the second data objects; and mapping each of the first unique instances to each of the second unique instances as the data object pairs.

15. The system of claim 14, wherein building the weighted mapping comprises:

creating a data structure;

populating the data structure with the first unique instances of the first data objects and the second unique instances of the second data objects; and connecting each of the first unique instances to each of the second unique instances using the weighted links.

16. The system of claim 13, wherein the metadata comprises one or more indicia of a relationship between a first data object and a second data object of a historical data object pair, wherein the one or more indicia comprises the first indicator, the second indicator, a third indicator representative of agreement with one of the first or second indicators; or a fourth indicator representative of disagreement with one of the first or second indicators.

17. The system of claim 13, wherein determining probabilistic relationships between a plurality of second input data objects and a first input data object comprises, for each second input data object:

locating, in the weighted mapping, a data object pair corresponding to a respective second input data object and the first input data object;

identifying a link associated with the located data object pair; and computing a score from a weight encoded onto the identified link, wherein the probabilistic relationship for the respective second input data object is based on the computed score.

18. The system of claim 13, wherein the processor is further configured to execute the instructions to:

update the weights encoded to the links based on the generated labels.

19. The system of claim 13, wherein determining the weight for the link associated with the data object pair comprises:

tracking at least the first and second indicators associated with each of the plurality of instances of the historical data object pairs; and aggregating the tracked indicators to compute a weight.

20. The system of claim 19, wherein tracking at least the first and second indicators comprises determining frequencies that the first and second indicators occur across the plurality of instances of the historical data object pairs, and wherein determining the weight for the link comprises computing the weight based on the determined frequencies.

* * * * *